June 3, 1952 G. T. RANDOL 2,599,525
AUTOMOTIVE POWER DRIVE CONTROL SYSTEM AND MECHANISM
Filed Dec. 11, 1944 12 Sheets-Sheet 8
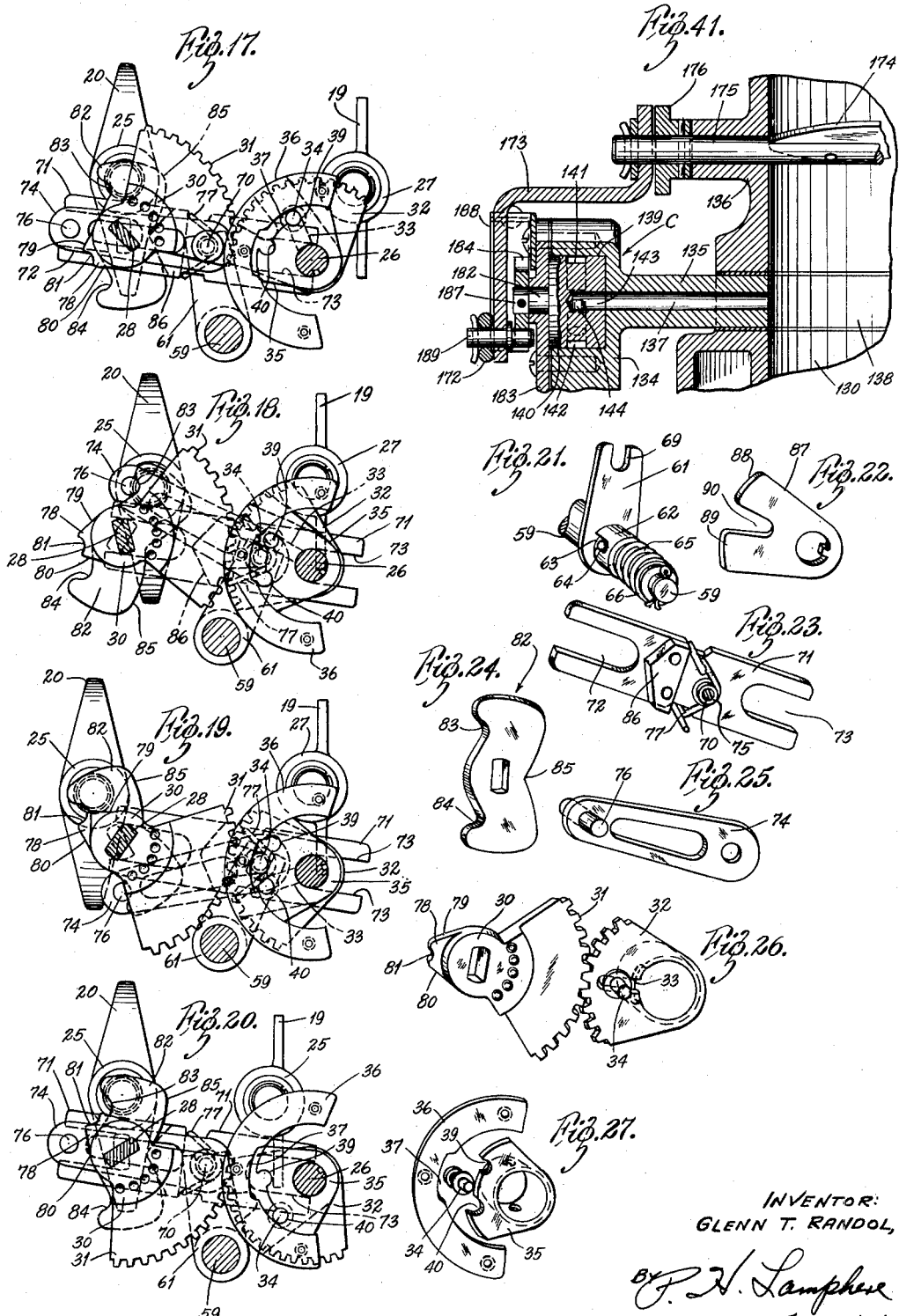
INVENTOR:
GLENN T. RANDOL,
ATTORNEY.

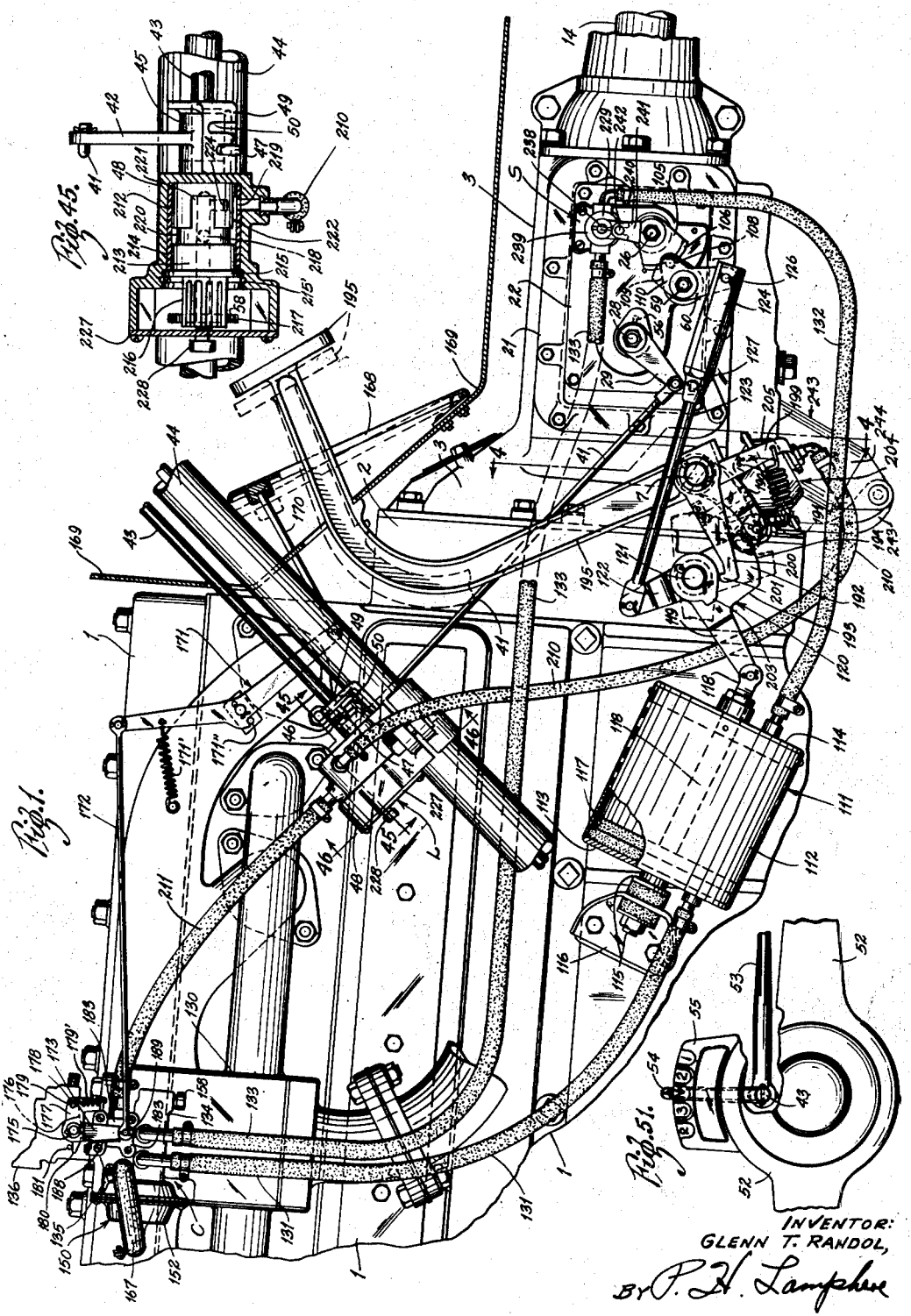

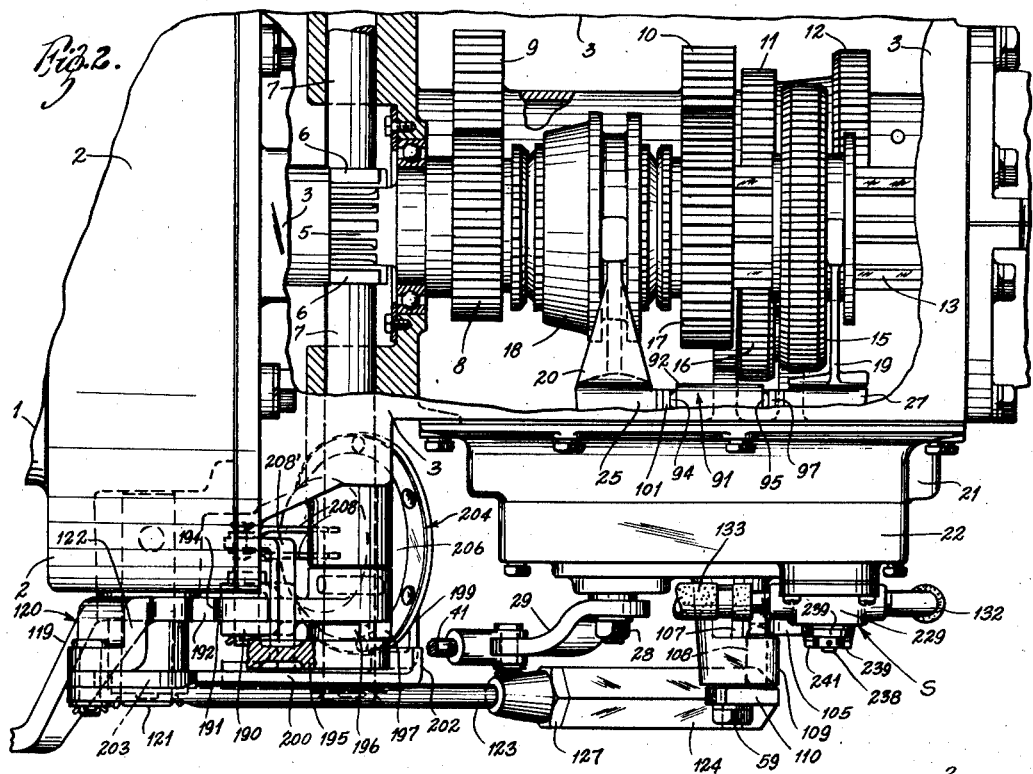
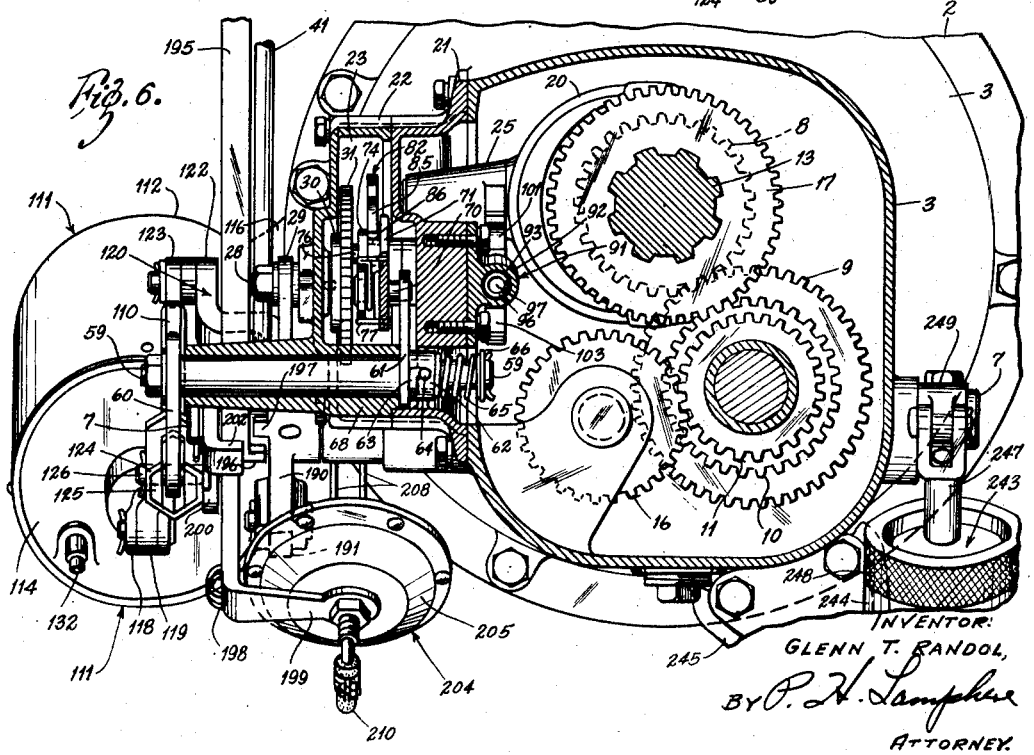

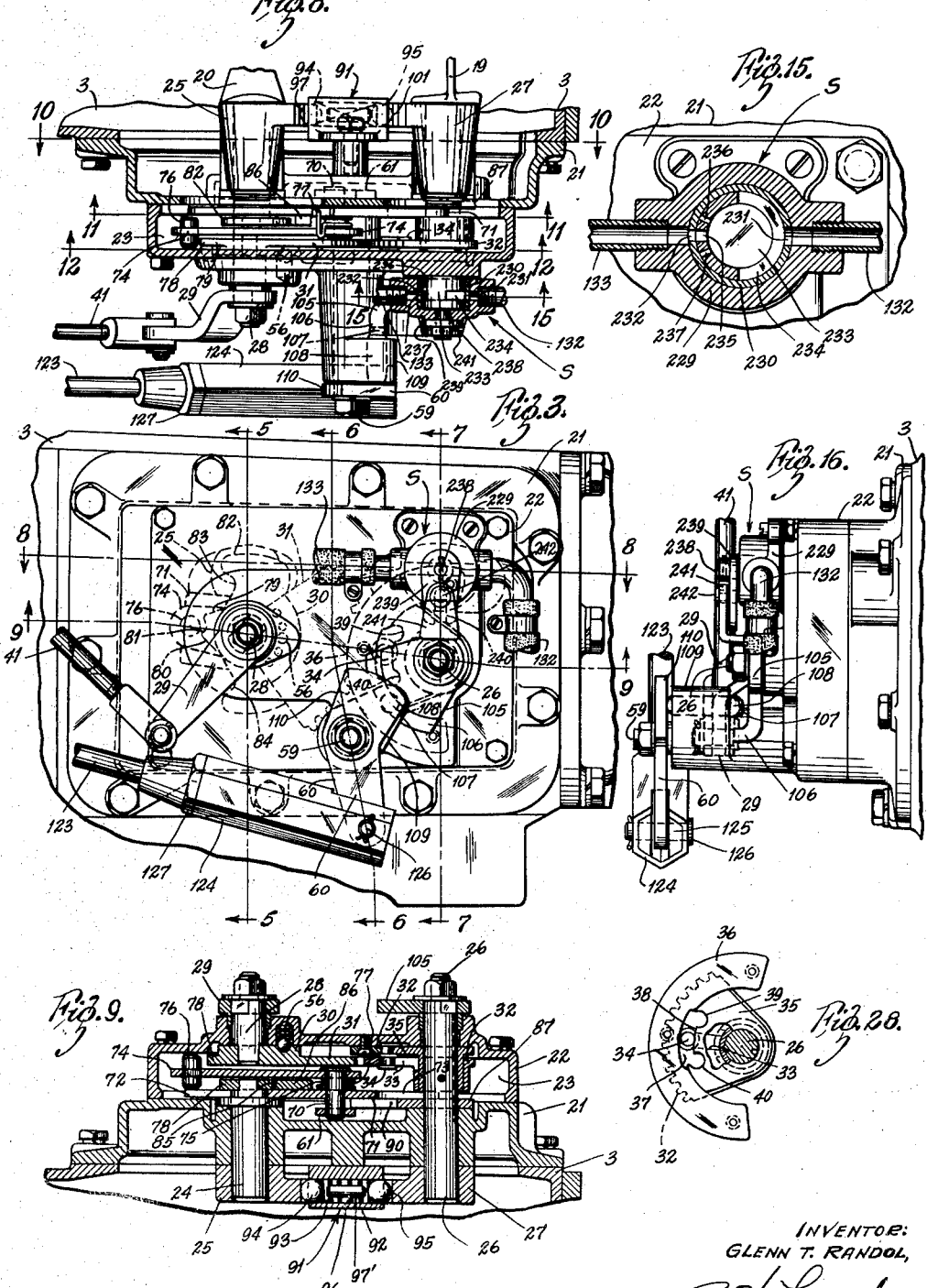

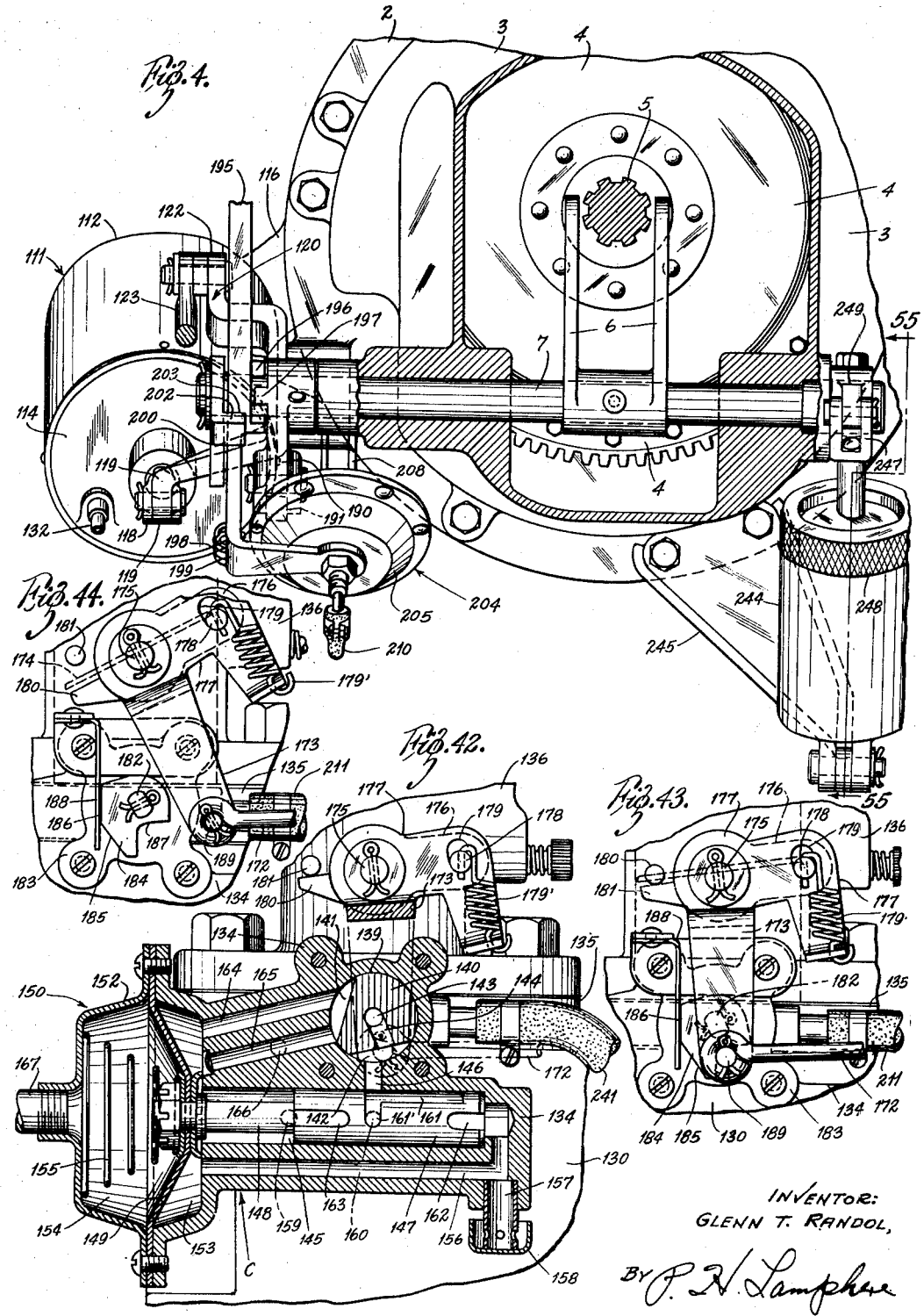

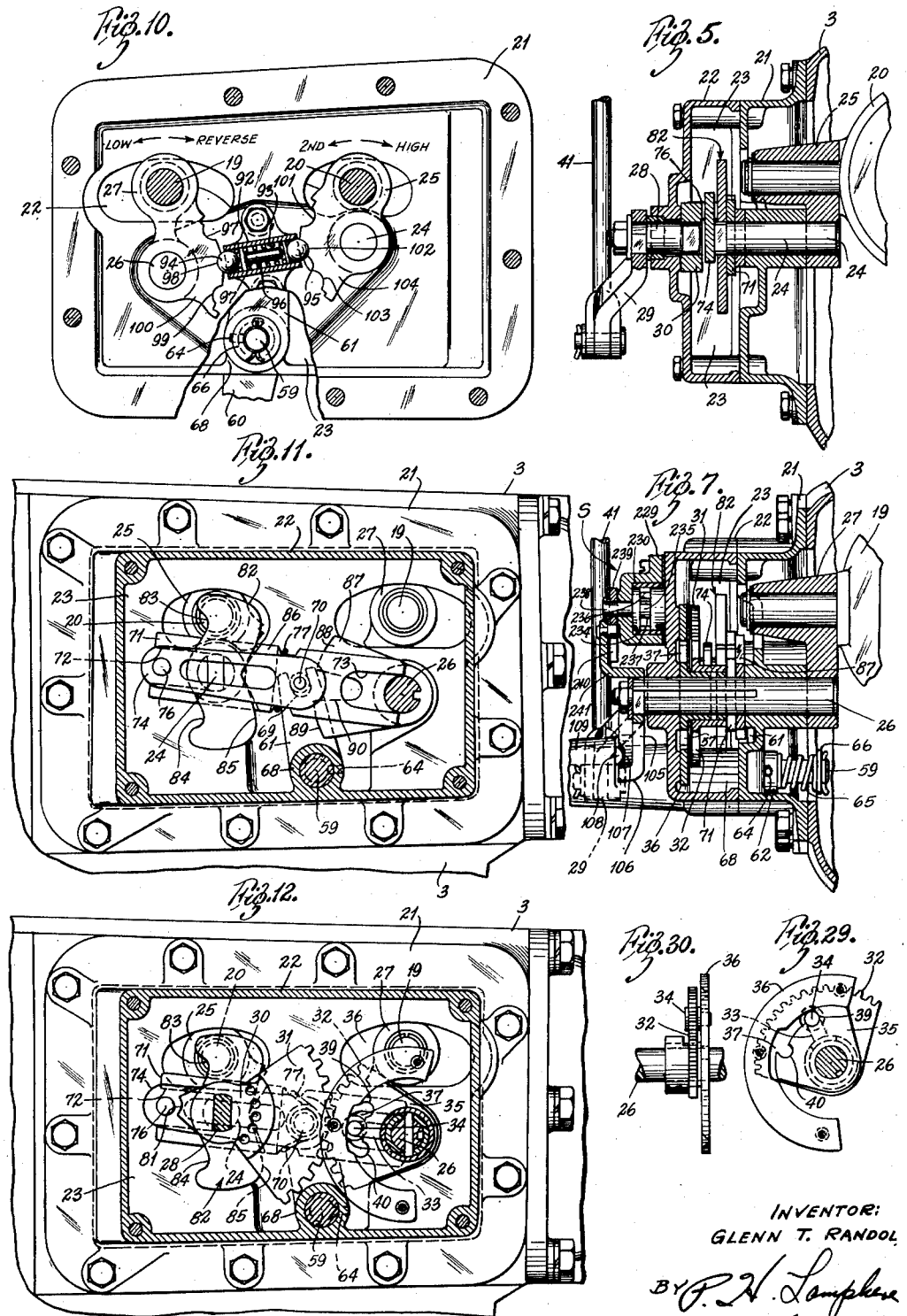

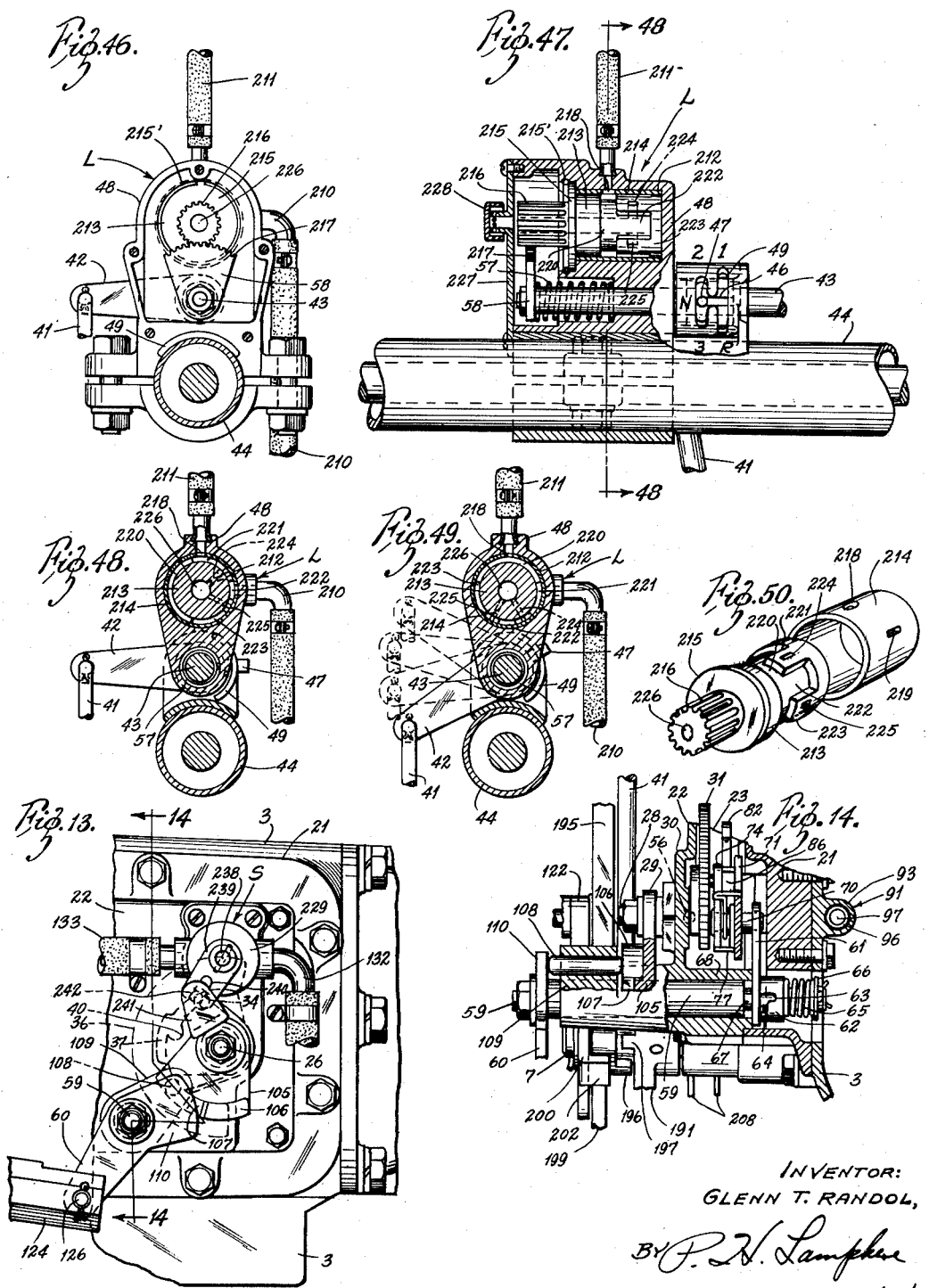

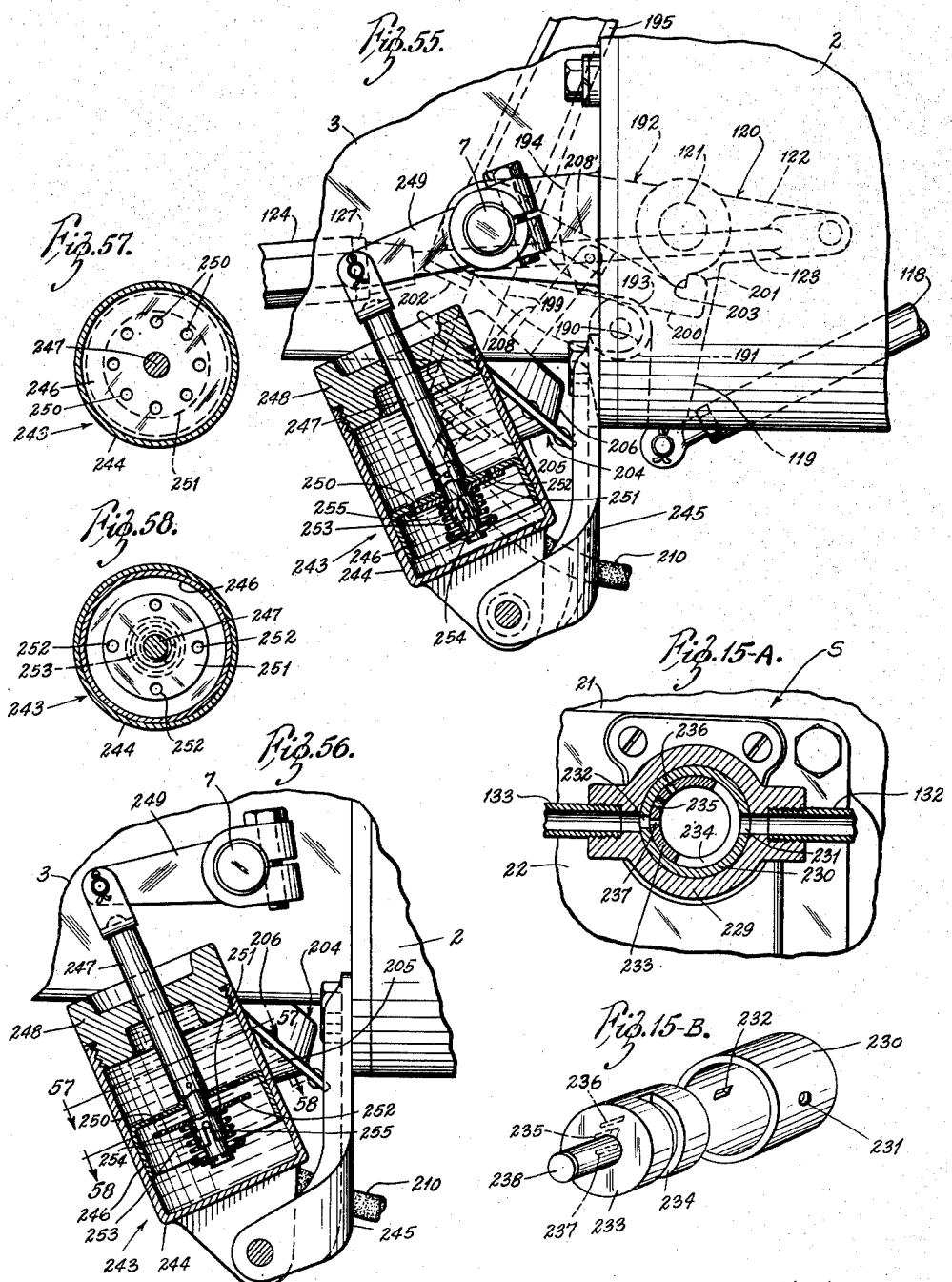

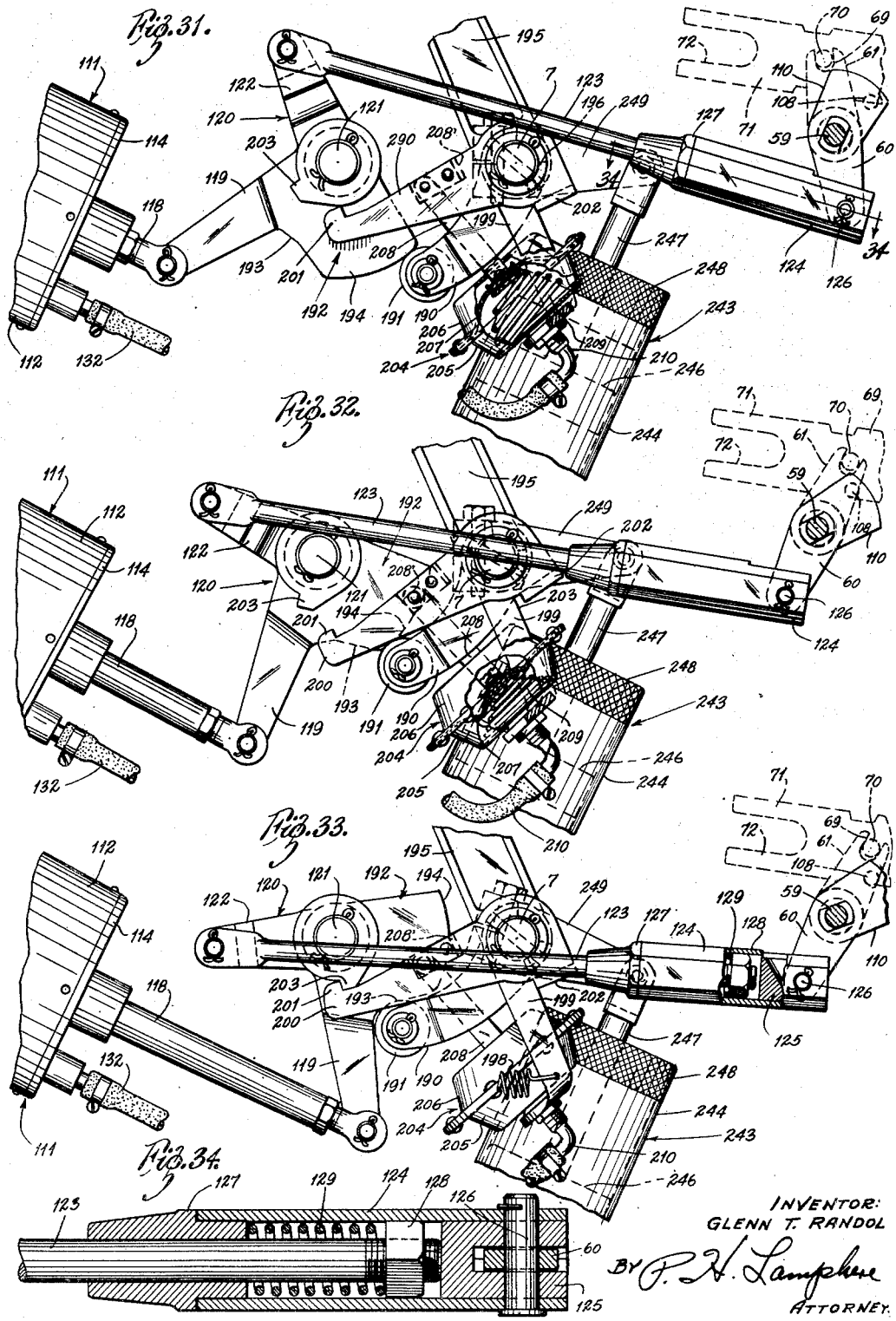

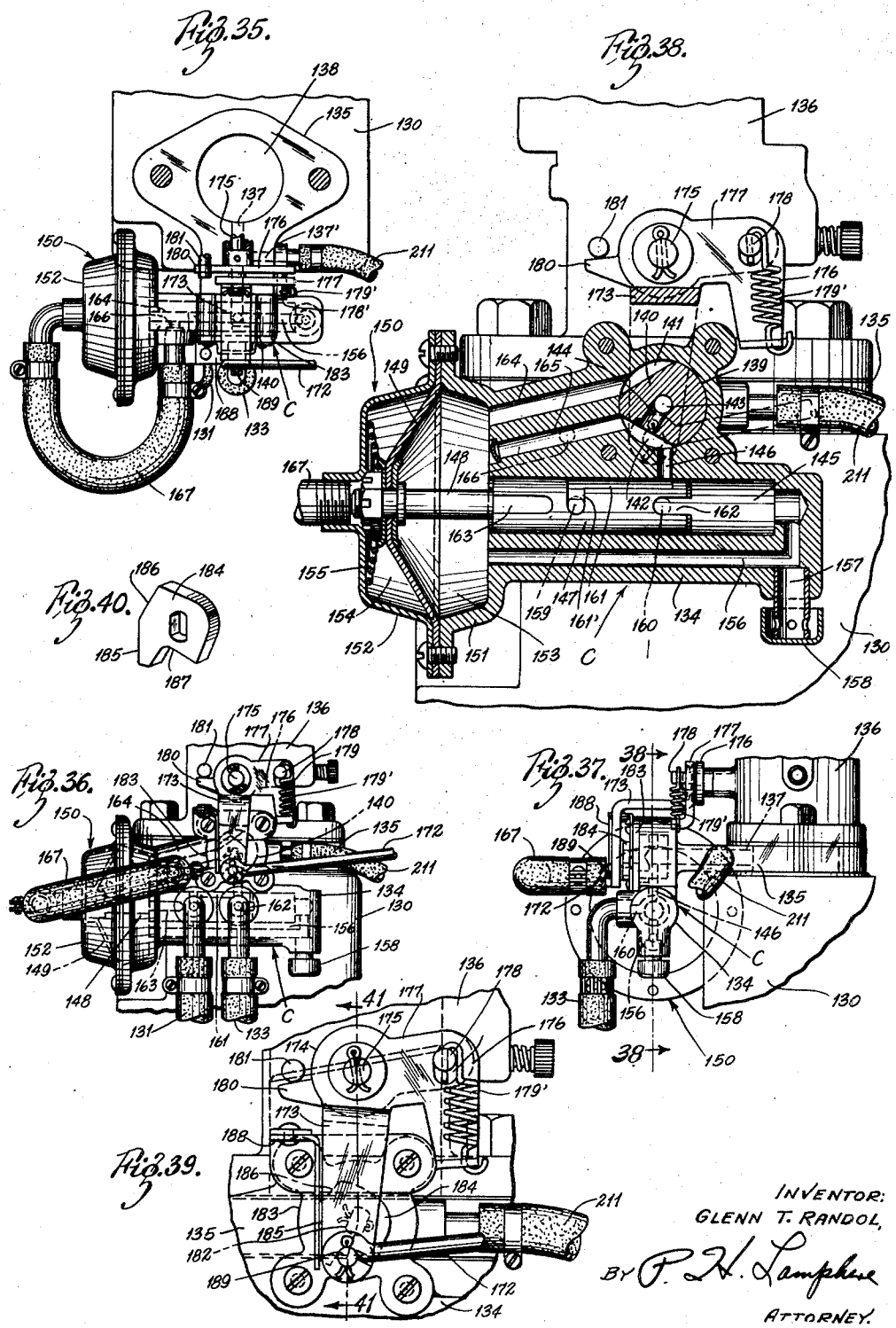

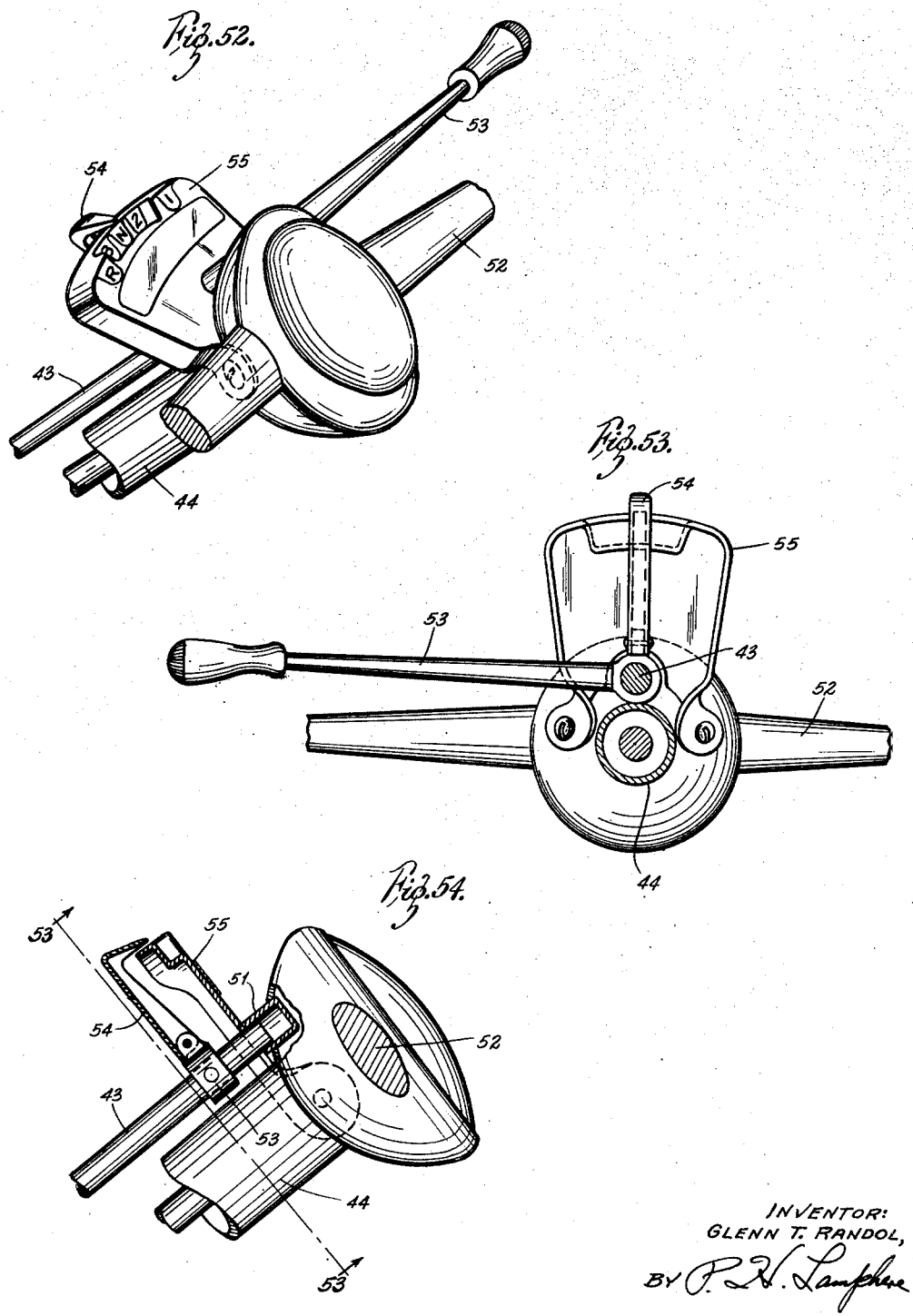

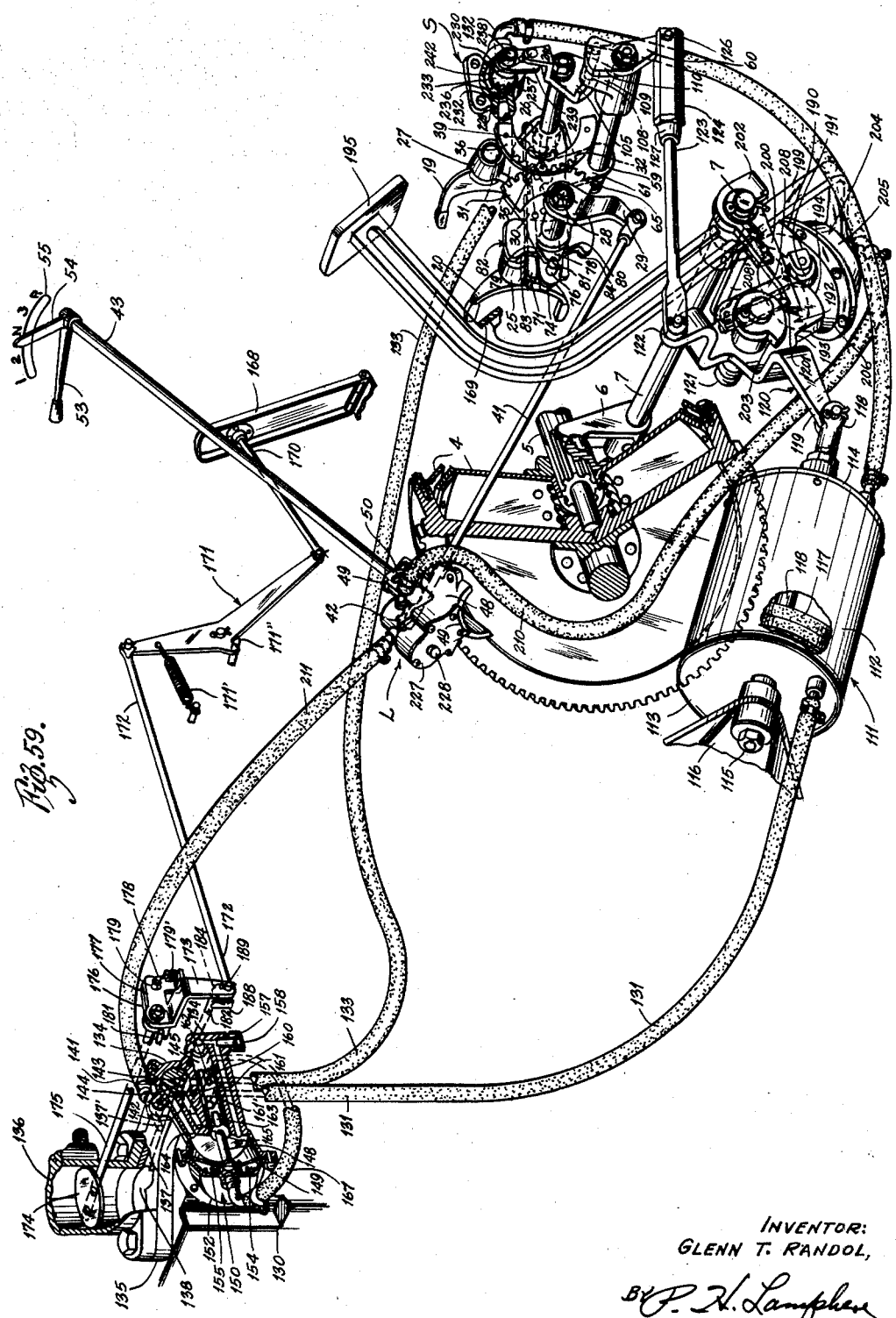

Patented June 3, 1952

2,599,525

UNITED STATES PATENT OFFICE 2,599,525

AUTOMOTIVE POWER DRIVE CONTROL SYSTEM AND MECHANISM

Glenn T. Randol, St. Louis, Mo.

Application December 11, 1944, Serial No. 567,612

61 Claims. (Cl. 192—.073)

This invention relates generally to change speed power drive systems, and more particularly to improved control mechanism therefor and being operable by a combination manual selecting and shifting member and the accelerator mechanism of the motor vehicle engine.

Among other important objects of this invention is to provide novel and improved control mechanism for a change speed gearing which will accommodate certain gear ratio drives to be manually established and other gear ratios to be established by power operated means under the selective control of the manual member employable in manually establishing the said certain gear ratios.

An object related to that last stated is to provide in such a control mechanism, a single connection from the manual member for manually establishing the certain gear ratios and for also selectively controlling the other power established gear ratios.

Still another important object of the invention is to provide improved single power-operated means for controlling both the vehicle friction clutch and the gear ratio changing of a change-speed gearing to thereby accomplish rapid and efficient gear ratio changes by eliminating operator coordination and reaction.

A further important object is to provide novel and improved change-speed drive control means whereby speed changes are established by power-operated means having a dual-stroke operating cycle such that, one stroke will be effective to disengage (interrupt torque delivery) the vehicle clutch and neutralize an active speed; while the other stroke will be effective coordinately with the first stroke to establish a selected speed drive and release the clutch for controlled re-engagement (restore torque delivery) upon the establishing of the selected speed drive as aforesaid.

A still further object is to provide in a control mechanism for a vehicle change speed gearing wherein power means is employed for controlling the friction clutch and the changing of gear ratios, a means for so disconnecting the power means from the gearing that said power means will only be effective to control the clutch.

A further object is to provide a control mechanism for a vehicle change speed gearing which utilizes a unitary fluid pressure motor to control a main vehicle friction clutch and to change certain gear ratios of the gearing, and to automatically prevent the motor from performing its gear ratio changing function when other gear ratios are manually controlled.

A further object is to associate with such a control mechanism means for causing the motor to operate to disengage the clutch and neutralize an active gear ratio, if conditioned so to do, when the accelerator mechanism of the vehicle engine is fully released to its idling position and to operate to change gear ratios and control clutch re-engagement when the accelerator mechanism is initially moved from released engine idling position prior to speeding up the engine.

A further object is to provide in a control mechanism for a change speed gearing embodying power shifting means for certain gear drives, a manually operable member for manually controlling other gear drives and for selectively determining the drive ratio which will be established by the power means.

A still further object is to so connect and associate the manually operable member with the other parts of the control mechanism that predetermined manual movements of a member controlled element in opposite directions from a neutral position will determine the gear ratio selected for establishment by the power means and additional manual movements beyond the predetermined movements will accomplish the manual establishment of the other gear ratios.

A further object of my invention is to provide in a fluid motor operated control means, improved valve means which will be so controlled by the accelerator mechanism for a vehicle engine that when said mechanism is fully released to idle the engine the movable element of the motor will be caused to have a full stroke in one direction and when the accelerator mechanism is initially depressed from said released position the movable element of the motor will be caused to have a full stroke in the opposite direction.

An object related to that last stated is to so associate said fluid motor and its control valve means with a vehicle friction clutch and change-speed gearing that one stroke of the movable element will disengage the clutch and neutralize the drive of an operative gear and the opposite stroke will establish a selected speed drive and control re-engagement of the clutch.

A further object is to provide in a control mechanism, power means for controlling a vehicle clutch and for changing gear ratios of a change speed gearing, and associate therewith, an operator controlled means for locking the power means in a condition wherein the clutch is engaged and a gear ratio is established.

An object related to that last stated is to so associate said locking means with the clutch operating pedal, that a slight initial lost-motion movement of the pedal will release the locking means so that the power means can function to disengage the clutch and neutralize the established gear ratio.

An object related to that last stated is to provide power-operated releasing means for said locking means which is manually controllable by the gear shifting lever.

A further object is to provide improved means for controlling the rate of engagement of a vehicle friction clutch which is operatively disengaged and released for controlled re-engagement by the functioning of power means.

A more specific object is to so provide improved control means for a vehicle change speed gearing having at least three forward driving ratios, that the power-transmitting friction clutch associated therewith is controllable by power means in accordance with the releasing and depressing of the engine accelerator mechanism, and all such drives are selectively obtained by the manual setting of a gear shifting lever; two of said gear ratios being established and neutralized by the said power means, and the third gear drive ratio being manually established and neutralized, and when the third drive is so controlled, the power means will be effective only to control the clutch, said control mechanism also embodying means preventing the power means from functioning to control the clutch and either of the said two gear ratios whenever one of the two gear ratios is established and the gear shifting lever is maintained so positioned for such gear ratio.

A further object is to provide a power-operated control mechanism for changing transmission speeds which will automatically disengage the associated vehicle clutch and neutralize an established speed when a manually-controlled selecting member is moved to an indicated neutral position.

A more general object is to provide improved control means for a conventional change-speed gearing which will simplify speed changing and thus enable the operator to better control the vehicle under all driving conditions.

A more specific object of the present invention is to provide a novel and improved control for a power-operated device for coordinately performing the usual clutching operations incident to a speed change and the changing of the gear ratios of a transmission associated with an internal-combustion engine of an automotive vehicle, which control is interconnected with the accelerator of the engine in such wise that the power device can act to declutch and neutralize an active gear ratio only when the accelerator is in released engine idling position and another vehicle control member, such as a clutch pedal, is operated; and when said accelerator is moved in an engine accelerating direction from its aforesaid released position to cause a selected gear ratio to become active and the clutch-actuated toward re-engagement, thus rendering effective the transmission of torque to the vehicular driving wheels.

In a more specific sense, it is an object of the present invention to provide such a control device connected with the accelerator pedal and operated as aforesaid by movement of the pedal, but before the pedal has moved sufficiently to increase the speed of the engine above idling speed.

Again, it is an object of the invention to provide a power-operated accelerator pedal controlled change-speed transmission shifter in which full release of the accelerator pedal does not cause any effort to engage gears by power operation, but rather in which release of the accelerator pedal accompanied by initial depression of the clutch pedal does cause power-operated declutching and disengagement of active gears, the foregoing having as its broad object to minimize gear clashing without other than normal and conventional elements of a gear shifting cycle, the minimizing of "clashing" coming about because of the release of the accelerator and subsequent depression thereof causing a selected shift to occur automatically when the gears are more nearly synchronized by reason of slight initial clutch engagement and when the operator is already acting to accelerate the engine which further improves gear synchronization. This last is especially true in shifting down from a higher speed to a lower speed drive.

Another specific object related to those above given is the provision of motor-power means operatively connected to disengage the clutch, establish selectively either of two speed drives, and control re-engagement of the clutch, the power means being operable in response to movement of an accelerator mechanism toward a throttle-opening operating position, and the power means being energized prior to actual opening of the throttle so that establishment of a selected speed drive and clutch actuation toward engagement occurs prior to vehicular acceleration.

Another object specifically related to that last set forth is the provision of a lost-motion connection between an accelerator and an associated throttle valve so that movement of the accelerator to control the power means can be accomplished prior to opening of the throttle valve and actual engine acceleration.

Other objects of the invention will become apparent from the following description taken in connection with the accompanying drawing showing a preferred embodiment.

In the drawings:

Figure 1 is a side view of a portion of a motor vehicle showing a change-speed gearing control mechanism embodying my invention, said mechanism being associated with the gearing, the power-transmitting friction clutch operating pedal and the engine accelerator mechanism, the parts being shown in positions corresponding to neutral condition of the gearing with the clutch disengaged and the accelerator mechanism fully released to engine idling position;

Figure 2 is a top view of the gearing and associated parts, the gearing casing being broken away and the gearing being shown in neutral condition;

Figure 3 is an enlarged side view of the parts on the exterior of the gearing casing cover plate;

Figure 4 is a sectional view taken on the line 4—4 of Figure 1 and showing certain parts associated with the main clutch and its pedal;

Figures 5, 6 and 7 are vertical sectional views taken on the lines 5—5, 6—6 and 7—7, respectively, of Figure 3;

Figure 8 is a horizontal sectional view taken on the line 8—8 of Figure 3 showing parts on the inside and outside of the cover plate;

Figure 9 is a substantially horizontal sectional view taken on the line 9—9 of Figure 3 and showing other parts on the inside and outside of the cover plate;

Figure 10 is a view of the inside of the cover plate as viewed on line 10—10 of Figure 8;

Figures 11 and 12 are sectional views taken on the lines 11—11 and 12—12, respectively, of Figure 8;

Figure 13 is an enlarged side view of the rear portion of the cover plate and parts thereon, said parts being shown in positions assumed when the fluid motor piston is moved to the rear end of its cylinder upon initial depressing of the accelerator pedal from its full released position following the establishment of low speed drive;

Figure 14 is a sectional view taken on the line 14—14 of Figure 13;

Figure 15 is a sectional view of the restricting valve, said view being taken on the line 15—15 of Figure 8;

Figure 15-A is another sectional view of the restricting valve but showing the element in the position assumed when low speed ratio is established;

Figure 15-B is a perspective view of the restricting valve element and sleeve;

Figure 16 is a rear view of the parts on the outside of the cover plate;

Figure 17 is a view of certain parts on the inside of the cover plate, said parts being in the positions assumed when low speed drive is established;

Figures 18, 19 and 20 are views of the parts shown in Figure 17 when such are in positions corresponding to second speed drive established, high speed ratio established, and reverse speed drive etablished, respectively;

Figure 21 is a view of the shifter arm and its disconnectible connection with the shifter shaft as viewed from the inside of the cover plate;

Figure 22 is a view of the interlocking plate;

Figure 23 is a view of the shifter plate;

Figure 24 is a view of the double arm shifting lever;

Figure 25 is a view of the shifter link;

Figure 26 is a view of the two manually-controlled gear sectors, one of which carries a preselecting cam;

Figure 27 is a view of the parts employed for connecting and disconnecting the driven gear sector to the low and reverse gear shifting shaft;

Figure 28 is a side view of the shifting parts associated with the low and reverse gear shifting fork, said parts being in positions corresponding to neutral position of the shifting fork;

Figure 29 is a view of the same parts shown in Figure 28 but showing them in positions corresponding to low speed being established;

Figure 30 is an end view of the parts shown in Figure 29;

Figure 31 is a view of the connecting parts between the fluid pressure motor, the engine clutch and the shifting mechanism on the cover plate, together with the vacuum-controlled lock for the fluid motor, said lock being unlocked and the piston of the motor in its normal forward position;

Figure 32 is a view similar to Figure 31 but showing the locking element held unlocked and the motor piston moving forwardly to the position shown in Figure 31;

Figure 33 is a view similar to Figures 31 and 32 but showing the parts in the positions assumed when the fluid motor piston is locked in its rear position;

Figure 34 is a sectional view taken on the line 34—34 of Figure 31 and showing details of the yieldable connection between the motor piston and the shifting mechanism;

Figure 35 is a top view of the valves and other parts associated with the engine carburetor and intake manifold which are controlled by the accelerator mechanism;

Figure 36 is a side view of the parts shown in Figure 35;

Figure 37 is a rear end view of the parts shown in Figure 32;

Figure 38 is a vertical sectional view taken on the line 38—38 of Figure 37;

Figure 39 is an enlarged side view of certain parts shown in Figure 36 particularly the connection between the accelerator pedal actuated rod and the carburetor butterby valve;

Figure 40 is a view of the connecting element between the accelerator mechanism and the rotatable valve whereby the latter is controlled by the former;

Figure 41 is a vertical sectional view taken on the line 41—41 of Figure 39;

Figure 42 is a sectional view similar to Figure 38 but showing the parts in the positions assumed when the accelerator pedal is slightly depressed from its fully released engine idling position to the position shown in dashed lines in Figure 1;

Figure 43 is a view similar to Figure 39 but showing the parts in the positions assumed when the accelerator pedal is slightly depressed;

Figure 44 is a view similar to Figure 43 but showing the parts in the positions assumed when the accelerator pedal is further depressed;

Figure 45 is a top view taken on line 45—45 of Figure 1 showing the manually-operated control valve and associated parts connected to the shift control shaft and mounted on the lower end of the steering column;

Figure 46 is a sectional view taken on the line 46—46 of Figure 1;

Figure 47 is side view of the structure shown in Figure 45, with portions of the casing being broken away and shown in section;

Figure 48 is a sectional view taken on the line 48—48 of Figure 47;

Figure 49 is a sectional view similar to Figure 48 but showing the parts in position corresponding to low speed drive being established, said view also showing by dashed lines the manually operated arm in the various positions it assumes when second, high and reverse speed drives are established;

Figure 50 is a perspective view of the manually operated valve element and its sleeve shown in Figures 45 to 49;

Figure 51 is a view of the gear shifting lever and associated parts as seen by the vehicle operator;

Figure 52 is a perspective view of the structure shown in Figure 51;

Figures 53 is a bottom view of the gear shifting lever and associated structure taken as indicated by line 53—53 of Figure 54;

Figure 54 is a side view partly in section of the gear shifting lever and associated structure;

Figure 55 is a view taken on the line 55—55 of Figure 4 showing the clutch re-engaging dashpot in the position it assumes when the engine friction clutch is engaged;

Figure 56 is another view of the dash-pot showing its parts in the positions assumed during clutch disengaging.

Figures 57 and 58 are sectional views through the dash-pot as taken on the lines 57—57 and 58—58, respectively, of Figure 56; and Figure 59 is a schematic view of the entire control mechanism shown in detail by Figures 1 to 58.

General assembly

Referring to the drawings in detail and first to Figures 1, 2, 4 and 6, there is shown a motor vehicle internal-combustion engine 1 to which is attached a clutch housing 2 and a change-speed gear housing 3. Within the clutch housing is a power-transmitting friction clutch 4 (see Figures 4 and 59) which connects and disconnects the crank shaft of the engine to the driving shaft 5 of the change-speed gearing contained within the housing 3. The clutch is operated by a fork 6 which is secured to a clutch shaft 7 journaled cross-wise in the bell portion of the gearing housing.

Speed-change mechanism

The driving shaft 5 of the gearing is journaled in the forward wall of the gearing housing and on its rear end within the housing is a driving gear 8 which is in constant mesh with a gear 9 for driving a cluster of counter shaft gears 10, 11 and 12 comprising, respectively, the second speed gear, the reverse speed gear and the low speed gear. Within the housing, in axial alignment with the driving shaft, is a driven shaft 13 which is connected by the usual universal joint to the propeller shaft 14 for driving the wheels of the vehicle in the well known manner. The rear portion of the driven shaft has slidably splined thereon a combined low and reverse gear 15 for selectively meshing with the low counter shaft gear 12 to produce low speed drive, or with an idler gear 16 constantly driven by the reverse gear 11 on the counter shaft to thus produce reverse speed drive. The gear 15 has a neutral position, shown in Figure 2, wherein neither gear 12 nor 16 is engaged. Just forwardly of the splined portion of the driven shaft is the other second speed gear 17 rotatably mounted on the driven shaft and constantly driven by the second speed countershaft gear 10. Interposed between the driving shaft gear 8 and the second speed gear 17 is a double clutch element 18 splined to the driven shaft and arranged to selectively clutch the second speed gear 17 to the driven shaft to obtain second speed drive or to directly clutch the driven shaft to the driving shaft to obtain third or high speed direct drive. To bring about establishment of these speeds, the double clutch element is provided with clutch teeth as shown for cooperation with clutch teeth on the second speed gear 17 and with the driving shaft, as is well known practice. The combined low and reverse speed gear 15 is controlled by a shifting fork 19 and the double clutch element 18 is controlled by a shifting fork 20.

The gearing housing is provided with an opening on its left side as viewed from the rear end. This opening is closed by a closure plate 21 which carries a cap 22, said cap forming with the closure plate a compartment 23. As best seen in Figures 5 and 9 the forward end of the closure plate has journaled therein a short shaft 24, one end of which extends into the compartment 23 and the opposite end extends into the gear housing. The gear housing end of this shaft has secured thereto an upstanding arm 25 in which is pivotally mounted the previously mentioned gear shifting fork 20 for the double clutch element 18 employed in obtaining second and high speeds. Rearwardly of the shaft 24 is another shaft 26 (see Figures 7 and 9) which is journaled in both the closure plate and the cap and extends through the cap compartment 23 so that one of its ends projects to the exterior of the cap and its other end extends into the gear housing. The gear housing end of this shaft carries an upstanding arm 27 in which is pivotally mounted the previously mentioned gear shifting fork 19 for controlling the sliding gear 15 to obtain the low and reverse speeds.

The cap 22 has journaled therein a short shaft 28 which is arranged to be in axial alignment with the previously mentioned shaft 24 (see Figures 5 and 9). The outer end of this shaft carries an arm 29 for rotating it and the inner end of the shaft has secured thereto a member 30 on which is formed a gear segment 31 arranged to mesh with a gear segment 32 rotatably mounted upon previously mentioned shaft 26 (see Figures 9, 17 to 20 and 26). This latter gear segment is provided with a radial slot 33 in which is slidably carried a pin 34. This pin is arranged for turning a sector shaped arm 35 which is secured to the shaft 26, as shown in Figures 27, 28 and 29. The sector shaped arm is arranged to rotate within an arcuate shaped member 36 which is fixed to the inside of the cap 22. The pin 34 extends into a space formed by a recess 37 in the member 36 and a recess 38 in the sector shaped arm, this latter recess having at its ends circular recesses 39 and 40 which are arranged to receive the entire pin so that it can move the sector shaped arm and thus rotate the shaft 26 and bring about the establishment of low and reverse speeds.

When the gearing is in a neutral position the pin 34 will be positioned as shown in Figure 28 which will be intermediate the ends of the space formed by the two recesses 37 and 38. When in this position the pin can move a predetermined distance in opposite directions without connecting the sector gear 33 to the sector arm 35. However, when the pin is moved an additional distance it will be forced out of the recess 37 and in the arcuate member and into either the circular recess 39 or 40, depending upon which direction the pin is being moved. When this occurs the pin will cause a direct connection between the sector gear 33 and the sector arm 35 so that these two members will rotate together and such rotation will cause a turning of the shaft 26 and a moving of the combined low and reverse gear 15. Figures 17 and 29 show low speed established condition and Figure 20 the reverse speed established condition of the sector gear, sector arm and associated parts. Thus it is seen by the structure just described that the short shaft 28 may have a predetermined free rotation in opposite directions from a central neutral position whenever the pin 34 is positioned as shown in Figure 28 before there is any establishment of low and reverse speeds. The purpose of this free motion of shaft 28 will later become apparent.

Manually-controlled shifting mechanism

The short shaft 28, which is journaled in the forward end of the cap 22, is arranged to be manually controlled by the operator of the vehicle and by this manual control, not only can low and reverse speeds be established in the manner just described, but also second and high speeds selected so that they can be established by power-operated means in a manner to become apparent. Referring now to Figures 1, 45, 47 and 51 to 54, the arm 29 on the outer end of the shaft 28 is connected by a link 41 to an arm 42 which is secured to the lower end of a shift control shaft 43 journaled in parallel relation to the steering column 44. The shaft 43 is not only arranged for rotatable movement, but is also capable of limited axial movement, and to accommodate these movements the hub 45 of arm 42 is provided with a slot 46 in which extends a pin 47. The arm is prevented from movement with the shaft by being positioned between spaced parts of a casing 48 secured to the steering column and in which the lower end of the shaft 43 is journaled. The casing opposite the arm has a semi-cylindrical covering portion 49 in which is an H-slot 50 and the pin 47 is of such length as to extend into this H-slot for cooperation therewith and thus predetermine the movements which can be made by the shaft 43.

The upper end of the shaft 43 is journaled in a socket 51 in the overside of the hub of the steering wheel 52 at the upper end of the steering column, as best shown in Figure 54. Just below the upper end of the shaft 43 there is secured to the shaft a gear shifting lever 53 which extends out on the right hand side of the steering column just beneath the plane of the steering wheel. Also secured to the shaft 43 is a pointer 54 which extends in an upward direction from the steering column and is arranged for cooperation with indicia carried by a plate 55 upstanding from the steering column. The indicia on this plate comprise the numerals "1, 2, 3" and the letters "R" and "N" and correspond respectively to low, second, high and reverse speed ratios and neutral condition of the gearing. The arrangement of these numerals and letters is as shown in Figures 51 and 52. The letter "N" being in the center with the numerals "2" and "1" on the right hand side thereof as viewed from the operator's position and the numeral "3" and the letter "R" on left hand side. The plate is provided with a central depression and the letter "N" and the numerals "2" and "3" are placed in this depression. The numeral "1" and the letter "R" are on the face of the plate at the ends of the depression. This gives a stepped arrangement of the indicia.

When the gear shifting lever is in a position where the pointer indicates "N," the control mechanism will be so conditioned that the gearing will be neutralized and none of the speed ratios established. This condition of the gearing is shown in Figure 2. Under such conditions the pin 47 carried by the lower end of the control shaft 43 will be in the lower end of the crossover portion of the H-slot. If the gear shifting lever should be pulled upwardly towards the steering wheel, the shaft 43 will also be pulled upwardly so that the shaft 43 can be selectively rotated to establish either the low or reverse speeds. If the lever is rotated so that the pointer indicates "1," the shaft 28 on the cap 22 will be so rotated that the segment gear 32 will cause the pin 34 to engage in the circular recess 39 and rotate the segment arm 35 to establish low speed which is a meshing of the gear 15 with the gear 12. If the gear shifting lever should be rotated when in its upward held position so that the pointer will be opposite "R," then the segment gears will be so rotated that the pin 34 will ride into the circular recess 40 and cause such a rotation of the segment arm 35 and shaft 26 as to establish reverse speed which is a meshing of the gear 15 with the idler gear 16. It is to be noted that to obtain the positioning of the pointer opposite the "1" and the "R" indicia, the gear shifting lever and shaft 43 must be pulled upwardly in order that pin 47 carried by the lower end of the shaft 43 will be opposite the long legs of the H-slot 50 so as to accommodate sufficient rotation of the shaft.

If the shifting shaft 43 is in its lower longitudinal position, the pin 47 can enter the short legs of the H-slot 50 and this will permit the gear shifting lever to move the pointer to indicate "2" and "3" which are the second and high speeds. This rotation of the shaft 43 will of course cause a rotation of the short shaft 28 journaled in the cap 22 and also a rotation of the segment gears, but such rotation of the segment gears will not cause any movement of the segment arm 35 or the shaft 26, due to the fact that the pin 34 has a free movement in the space formed by the recess 37 in the fixed arcuate plate and the recess 38 in the segment arm.

In order that the five positions to which the segment gear 31 and the parts rotated therewith may be easily found and yieldably maintained, there is provided a ball detent 56 for cooperation with five arcuate spaced recesses in the hub portion of the segment gear, this detent and the recesses being shown in Figures 9, 17 to 20, and 21. It is also desirable to yieldably maintain the steering column shaft 43 in its lowermost position so as to be in position to obtain second and high speeds, the speeds most used. In order to accomplish this there is provided, as shown in Figure 47, a spring 57 which is interposed between a portion of the casing 48 and a sector gear 58 carried by the lower end of the shaft 47, the gear 58 being employed for valve controlling purposes to be described subsequently.

In addition to the shafts 26 and 29, which extend to the exterior of the cap 22, there is also a shaft 59 which is journaled in the cap and is intermediate the shafts 26 and 29 and below said shafts as shown in Figures 1, 3, 6, 13 and 14. The outer end of this shaft 59 carries an arm 60 for rotating the shaft and on the inner end of the shaft is a lever 61 which extends upwardly into the compartment 23 between the cap and the closure plate. This lever 61 has a hub 62 which is provided with an L-shaped slot 63 (see Figures 14 and 21). Cooperating with this slot is a pin 64 carried by the shaft 59 and forming the connection between the shaft and the lever. A spring 65 is interposed between the hub 62 and a washer 66 on the outer end of the shaft and acts to bias the hub against a shoulder 67 on the shaft 59, which position is effected only when the pin 64 can move into the axial portion of the L-shaped slot as is shown in Figures 6 and 21. The lever 61 is arranged to lie adjacent the end of a boss 68 carried by the cap 22 and in which the shaft 59 is journaled, this boss preventing axial movement of the hub of the arm. The shaft 59 is arranged to have limited longitudinal movement and when it is moved longitudinally outwardly it can be disconnected from the hub of lever 61 by the pin 64 becoming positioned so that it can move into the circumferential portion of the L-slot as shown in Figure 14. Thus it is seen that there is provided an arrangement whereby the lever 61 can be prevented from being rotated by the shaft 59 whenever the shaft is pulled outwardly against the bias of spring 65. When the shaft is so positioned that the pin 64 can enter the axial portion of the L-shaped slot, the arm and shaft will be connected together so that the arm can be rotated with the shaft.

The upper end of the lever 61 is provided with a U-shaped slot 69 for receiving a pin 70 which is carried by the central portion of a shifter plate 71, shown in detail in Figure 23. This shifter plate has U recesses 72 and 73 in its ends which receive portions of the shafts 24 and 26, respectively, as is seen in Figures 9 and 17 to 20. Thus the shifter plate will be supported and yet be free for longitudinal sliding movement. The pin 70 is of such length as to have pivoted thereto a shifter link 74 which is spaced slightly from the plate by a spacer sleeve 75 and extends forwardly parallel to the forward end of the shifter plate, all as is best seen in Figure 9.

The forward end of this shifter link carries a cross pin 76. The shifter link is normally yieldably held so as to be in line with the shifter plate, this being accomplished by a specially shaped spring 77 which is carried by the pin 70 and has legs for cooperation with the opposite edges of the shifter link. This spring is shown in detail in Figure 23. One end of the cross pin 76 is arranged to cooperate with a selecting cam 78 which is formed as an integral part of the hub of the sector gear 30, already described, and rotated by the short shaft 78. This cam is shown in perspective in Figure 26 and has two diverging surfaces 79 and 80 with a recess 81 at its end and from which the two surfaces diverge. The purpose of this cam is to guide the shifter link, either upwardly or downwardly, from its normal position maintained by the spring 77.

When the selector member 30 is moved by the gear shifting lever so that the cam surface 79 is presented for engagement by the pin 76 of the shifter link (this being "2" position on the indicator plate), the pin 76 on the end of the shifter link will be forced upwardly in the event the shifter plate and the link are moved rearwardly. If the cam surface 80 is presented for cooperation with the pin 76 of the shifter link (this being "3" position on the indicator plate), then the pin 76 and the link would be forced downwardly if the shifter plate is moved rearwardly. If the gear shift lever should be in the "N" position then the recess 81 at the end of the cam will be presented for receiving the pin 76 of the shifter link and thus prevent the shifter link and shifter plate from being moved rearwardly after these elements are moved to a limited extent to bring the pin into the recess.

On the end of the shaft 24 which projects into the chamber 23 of the cap, there is secured a double arm lever 82 shown in Figures 11, 12, 17 to 20 and 24. The forward edge of this double arm lever has recesses 83 and 84 for cooperation with the cross pin 76, and the rear edge has a V-shaped notch 85 which is arranged to cooperate with a V-shaped block 86 carried by the shifter plate. Since the double arm lever 82 is secured to the shaft 24, it is seen that by rotating the double arm lever the shaft 24 and the shifter fork 20 for controlling second and high speeds can be moved. When the notch 83 is engaged by the pin 76 of the shifter link as it moves rearwardly, the shaft 24 will be given such a rotation that the second speed gear 17 will be clutched to the driven shaft of the gearing and second speed drive established (see Figure 18). When the notch 84 is engaged and the double arm lever moved by movement of the shifter link, the result will be the establishment of high speed drive due to the direct connecting of the drive and driven shafts of the gearing (see Figure 19). Which of the notches 83 and 84 will be engaged by the pin 76 will depend upon the position of the cam surfaces 79 and 80 as they determine to which notch the pin 76 will be guided. Thus, if cam surface 79 is presented to guide the pin 76 into the notch 83 and the double arm lever rotated, second speed drive will be established, and if the cam surface 80 is presented then the pin 86 will be guided into the notch 84 and the double arm lever 82 so rotated that high speed drive will be established.

The double arm lever 82 is always brought to its vertical position whenever the shifter plate is moved forwardly, as shown in Figures 11, 12, 17 and 20. This bringing of the lever to its vertical position will always insure that an established gear ratio (second or high) will be neutralized. This neutralization is accomplished by means of the V-shaped block 86 on the shifter plate cooperating with the V-shaped notch 85 in the rear of the double arm lever 82. If the double arm lever should be in either its second or high speed positions, as shown in Figures 18 and 19, which has been brought about by a rearward movement of the shifter plate, then it is seen that as the shifter plate moves forwardly the V-shaped block will engage the V-shaped notch 85 of the double arm lever and turn it to its vertical position, thereby neutralizing the speed which is established.

When the selecting cam 78 is presented so that its recess 81 at the end is directly opposite the pin 76 of the shifter link (when in its normal horizontal position), the shifter plate and shifter link can be moved rearwardly only a very limited extent, the extent being determined by the space between the recess 81 and the pin. Thus the shaft 59 will be prevented from having its normal rotation if connected with lever 61. This condition will prevail only when the gear shifting lever is in the "N" or neutral position.

Associated with the shifter plate is an interlocking plate 87 which is shown separately in Figure 22. This interlocking plate is arranged to be secured for rotation with the shift 26 which carries the arm 27 in which the low and reverse speed shifting fork 19 is pivoted. The interlocking plate is provided with two legs 88 and 89 which form therebetween a slot 90. The interlocking plate lies alongside of the shifter plate and extends towards the pin 70 which forms the connection between the shifting lever 61 and the shifter plate.

When the shifter plate is in its forward position, the interlocking plate is free to rotate as will also be the shaft 26 to which it is secured. Thus the shaft 26 can be rotated under these conditions to establish either low or reverse speed. When the shaft 26 is in its neutral position, corresponding to neutral condition of the low and reverse speeds, the slot 90 in the interlocking plate will be presented to receive the pin 70, thus permitting the pin and the shifter plate to be moved rearwardly to establish second or high speed. If either second or high speed is established the interlocking plate will prevent either low or reverse speed from being established. When the interlocking plate 87 is turned so that either low or reverse speed is established, one of the legs 88 or 89 will be presented so that it will have its end engaged by the pin 70 and thus prevent rearward movement of the shifter plate. It is thus seen that this interlocking plate also works in conjunction with the selector cam end which has the recess 81, both providing means whereby the shifter plate is prevented from rearward movement. The interlocking plate will function to prevent any substantial rearward movement of the shifter plate when low or reverse speed is established, thus there can be, under these conditions, no establishment of the second and high speeds since the shifter plate cannot move rearwardly to its fullest extent. When low and reverse speeds are neutralized and the gear shift lever is in neutral position, then the end of the selecting cam 78 will prevent any substantial rearward movement of the shifter plate by the engagement of the pin 76 in the recess 81. The only time that the shifter plate can move rearwardly so as to establish second or high speed is when low and reverse speeds are neutralized and the selecting cam is turned to its first positions on each side of its straight ahead position by the gear shifting lever so as to present either the cam surface 79 or 80 for engagement by the pin 76 to thereby guide it into a notch of the double arm lever 82. These conditions are shown in Figures 18 and 19.

In order that the two shifting forks 19 and 20 may be yieldably held in their various positions, there is provided a detent means generally indicated by the numeral 91 and shown in Figures 2, 6, 9 and 10. This detent means comprises a member 92 secured to the inside of the cover plate, which member is provided with a bore 93 in which is positioned two balls 94 and 95 having an interposed spring 96. There is also a pin 97' to limit the extent of movement of the balls relatively towards each other. The ball 94 cooperates with three recesses 97, 98 and 99 in a flange 100 carried by the arm 27, in which the shifting fork 19 is pivoted. The ball 95 cooperates with recesses 101, 102 and 103 in a flange 104 carried by the arm 25, in which the gear shifting fork 20 is pivoted. It is thus seen that for each position of the shifting forks the detent structure will function to yieldably hold the shifting fork in such position. This detent structure could be made to function as an interlock if such were desired in order to prevent one gear ratio from being established when another speed ratio is established, but in view of the interlocking structure already described such is not believed necessary.

In order that the lever 61 carried by the inner end of the shaft 59 may be automatically disconnected from the shaft by means of the structure already described, there is provided means for accomplishing this whenever the gearing is placed in low or reverse speed drive. The automatic disconnecting structure is best shown in Figures 13 and 14. On the shaft 26 there is secured an arm 105 which is provided with an out-turning flange 106. The edge of this flange is provided with a recess 107 intermediate its ends for the reception of one end of a pin 108 which is slidably mounted in an extension 109 of the boss in which the shaft 59 is journaled. The other end of the pin 108 is arranged to cooperate with an extension 110 which is carried by the lever 60 secured to the outer end of the shaft 59. The extension 110 is of such width that regardless of what position the arm 60 is turned the extension will always cooperate with the outer end of the pin 108.

When the shaft 26, which controls the low and reverse gear shifting fork, is in its position to neutralize low and reverse drive ratio, the recess 107 will be positioned to receive the inner end of the slidable pin 108. Under such conditions the previously mentioned spring 65 on the inner end of the shaft 59 can then function to place the pin 64 (carried by the shaft 59) in the axial extending portion of the L-shaped slot 63 in the hub of the lever 61, thus connecting the shaft 59 and the lever 61 so that the two will be rotated simultaneously. However, when the shaft 26 is moved to either establish low or reverse speed, the pin 108 will be cammed out of the recess 107 upon the edge of the flange, thereby shifting the pin 108 outwardly and also the shaft 59 due to the fact that the outer end of the pin is engaged with the extension 110 which is part of the arm 60 carried by the shaft. This axial movement of the shaft 59 will cause the pin 64 on the inner end of the shaft to be moved out of the axial leg of the L-shaped slot to a position wherein it can move in the circumferential portion of the L-shaped slot. This condition is shown in Figure 14. Lever 61 is now disconnected from the shaft 59 and regardless of the rotation of the shaft 59 in a counterclockwise direction from the position shown in Figure 13, there will be no turning of the lever 61 with the shaft 59. Since the lever 61 controls the shifter plate and the establishment of the second and high speed, it is seen that whenever the lever 61 is disconnected there cannot be any movement of the lever 61, yet the shaft 59 is free to be rotated. The disconnecting of lever 61 from shaft 59 is aided by the interlocking plate 87 for as soon as the shaft 26 is rotated the plate functions to prevent movement of arm 61 and the shifter plate. The purpose of this free rotation of the shaft 59 will become apparent when other structure and its function is described.

*Power-actuated shifting mechanism*

The shaft 59, which controls the establishment of second and high speeds, it arranged to be power actuated and the power means employed for this purpose is a fluid pressure operated servomotor or servo-mechanism 111 which is shown in various figures, including Figures 1, 4, 6, 31 to 33 and Figure 59. The fluid motor 111 comprises a cylinder 112 closed at both ends by end walls 113 and 114. The fluid motor is positioned along side the engine of the vehicle and the forward end wall 113 carries a mounting pin 115 which is yieldably connected to a bracket 116 secured to the side of the engine. Within the cylinder is a piston 117 having a piston rod 118 extending through the rear wall 114. The outer end of this piston rod is connected to one arm 119 of a bell-crank lever 120 pivotally mounted on a pin 121 carried by the clutch housing 2. The other arm 122 of the bell-crank lever is connected by a rod 123 with the previously referred to arm 60 secured to the outer end of the shaft 59 which controls the shifter plate and the establishment of the second and high speed ratios.

The bell-crank lever and the rod 123 are all clearly disclosed in the enlarged views, Figures 31, 32 and 33. The connection between the rod 123 and the lever 60 embodies a yieldable structure which is clearly shown in Figure 34. Slidable on the rear end of the rod is a tube 124 which is closed at its rear end by a plug 125, the plug and the rear end of the tube being pivotally connected to the outer end of the arm 60 by a pin 126. The forward end of the tube is provided with a bearing nut 127 through which the rod 123 extends into the tube 124. The inner end of the rod is provided with an adjusting nut 128 and interposed between this nut and the bearing nut is a coil spring 129 which normally biases the end of the rod 123 against the rear plug 125.

The yieldable connection functions to give an over-center action of the rod with respect to the pivot of the bell-crank lever. When the piston of the fluid motor is at the forward end of its cylinder, the shifter plate 71 will be in its forward position, which position is shown in Figures 11 and 12. When the piston is moved toward the rear end of the cylinder the shifter plate will be moved rearwardly to its fullest extent as determined by the engagement of the shifter plate with the shaft 26 or by the pin 70 with the base of the interlocking plate slot 90, that is, of course, if the shifter plate is permitted to move rearwardly by a conditioning of the selector cam and the neutral position of the interlocking plate 87. The extreme rearward position of the shifter plate will be reached before the piston completes its full travel to the rear wall of the cylinder. This condition is shown in Figure 32. As the piston continues to move to the rear wall, the spring 129 will yield to permit this additional movement of the piston and during this yielding of the spring the bell-crank lever will be so turned that the rod 123 will pass from one side of the axis of the bell-crank pivot pin 121 to the other side, as shown in Figure 33. When the relationship of the rod and the bell-crank lever is as shown in Figure 33, the spring will act to maintain this condition and the shifter plate cannot be moved forwardly by any force acting thereon. When the piston of the servomotor is caused to move from the rear end to the forward end of its cylinder the shifter plate will again be moved forwardly and either the high or second speed drive will be neutralized in a manner already apparent, it being noted that this neutralization takes place by the action of the V-shaped block 86 on the rear edge of the double arm lever 82 which is provided with the V-shaped recess 85. Of course if the gearing should be in either low or reverse speed drive the shifter plate will not be moved by the reciprocation of the piston of the fluid motor since under these conditions the lever 61 which actuates the shifter plate is disconnected from the shaft 59. The piston will therefore only rotate the shaft 59 relative to the lever 61. If the gear shift lever should be in the "N" position, then the shifter plate cannot be moved and the lever 61 is connected to the shaft 59. Under such conditions when the piston is controlled to move from the forward end of the cylinder it will only move sufficiently to compress spring 129 and will then stall.

The over-center action of the rod and compressing of spring 129 will also be present when the shaft 59 is rotated relative to the lever 61. This function is accomplished by a proper length of the circumferential portion of the L-shaped slot 63 in the hub of lever 61. This portion of the slot is so formed that the lever 61 will be picked up and the shifter plate moved to cause the pin 70 to engage the end of a leg 88 or 89 of the interlocking plate when the bell-crank lever and rod reach the positions shown in Figure 32. As the piston of the fluid motor moves to complete its stroke the spring will be compressed in the same manner as when the shifter plate was being moved to establish second or high speed.

*Fluid pressure actuated motor and control therefor*

The fluid pressure operated servomotor 111 is arranged to be actuated by a source of fluid pressure different from atmosphere and the particular source employed, by way of example, in this application of the control system comprises an inlet manifold 130 of the vehicle engine. The forward end of the fluid motor is connected by a conduit 131 to a control valve generally indicated by the letter C and attached to the suction or intake manifold of the engine, this valve and its associated parts being shown in detail in Figures 35 to 44. The rear end of the fluid motor is also connected by two conduits 132 and 133 to the control valve C and being interposed between these conduits is a restricting valve S which is mounted upon the upper rear corner of the cap 22 secured to the cover plate of the gearing.

The control valve means C comprises a casing 134 which is provided with a lateral extension 135 forming a spacer to be inserted between the carburetor 136 for the engine and the central part of the intake or suction manifold 130. The spacer extension of the valve casing is best shown in Figures 37 and 38 and this extension has a passage 137 which leads from the intake passage 138 to a cylindrical bore 139 in the valve casing 134. In this bore is mounted a cylindrical valve element 140 having two slots 141 and 142 cutting through its cylindrical surface. These slots, which are best shown in Figures 38 and 42, diverge toward each other so that only a small surface of the valve element prevents the slots from communicating with each other. The slot 142 is arranged to be in constant communication with the passage 137 and this is accomplished by an axial passage 143 and a radial passage 144 in the valve element.

The casing 134 is also provided with a bore 145 which lies below the bore 139 and at right angles thereto. This bore 145 communicates with the bore 139 by means of a passage 146 which is so arranged that under certain conditions it can communicate with the slot 142 and the intake passage of the engine through the spacer. The bore 145 has reciprocal therein a valve plunger 147 provided at its forward end with a piston rod 148 for connecting the plunger with a diaphragm 149 of a small suction-operated motor 150. The casing of this suction motor comprises a cup-shaped extension 151 on the valve casing 134 and a cup-shaped cap 152. The diaphragm 149 is clamped between the cup-shaped extension and the cap and said diaphragm forms with the cup-shaped extension an air chamber 153 and with the cap a suction chamber 154, which chambers are on opposite sides of the diaphragm. A spring 155 is interposed between the cap and the piston 148 of the plunger to thus normally bias the diaphragm 149 and the valve plunger 147 rearwardly to the position shown in Figure 42. The rear end of the bore 145 and the chamber 153 of the suction motor are both arranged to be in constant communication with the atmosphere, this being accomplished by an L-shaped passage 156 which communicates with an atmospheric port 157 having a breather cap 158.

The bore 145 in which the valve plunger 147 is situated is arranged to communicate with conduits 131 and 133 which are connected respectively to the front and rear of the fluid motor 111 as already noted, this connection being accomplished by ports 159 and 160, the port 159, to which the conduit 131 is connected, being situated forwardly of the port 160 to which the conduit 133 is connected, the relationship of said ports being shown by dotted lines in Figures 33 and 42.

The valve plunger 147 is provided on its top with an axial groove 161 which communicates at its inner end with a short circumferentially extending groove 161' which is provided for placing the axial groove 161 in communication with either of the ports 159 or 160, depending upon the position of the valve plunger. The axial groove 161 is of such length as to be in constant communication with the short passage 146, regardless of the position of the plunger, thus insuring that the axial groove 161 will be in constant communication with the suction manifold, it being remembered that the passage 146 between the two bores is arranged to communicate with the slot 142, which slot is connected to the intake passage 144 and 143 in the valve element 140. The rear end of the valve plunger is provided with a notch 162 which is arranged so that the port 160 can be uncovered whenever the valve plunger is moved by the suction motor to its forward position shown in Figure 38. When this condition exists the conduit 133 will communicate with atmosphere since the rear end of the bore 145 is always in communication with the atmosphere.

The surface of the valve plunger forwardly of the short circumferentially extending groove 161' is provided with an axially extending groove 163 which is arranged to cooperate with the port 159 and to place said port in communication with the bore 145 forwardly of the plunger portion of the valve whenever the axial groove 161 is communicating with the port 160 and to maintain the communication between the port 159 and the forward portion of the bore 145 as the plunger moves forwardly from its rearmost position until it approximately reaches its forward position shown in Figure 38. When the plunger reaches its forward position the axial groove 163 will no longer communicate with the port 159. Port 159 will then communicate with axial groove 161 and the suction passage of the engine. Whenever the axial groove 163 is communicating with port 159, then this port will be in communication with atmosphere since the bore 145 forwardly of the plunger is in communication with the atmosphere by way of the suction motor chamber 153 and the passage 156.

Between the rear chamber 153 of the suction motor and the bore 139 containing the valve element 140 is a passage 164, which passage is arranged to cooperate with the slot 141 in the valve element 140. Below the passage 146 is a parallel passage 165 which leads from the bore 139 in which the valve element 140 is situated. This passage connects with a port 166 which is connected by an external conduit 167 to the forward chamber 154 of the suction motor 150. The passage 165 is drilled from the forward end of the valve casing and its forward end is suitably plugged so as to prevent the passage from communicating with the rear chamber 153 of the suction motor. The passage 165 so enters the bore 139 that the slots 141 and 142 can be alternately connected with this passage.

If the valve element 140 should be so positioned that the slot 141 communicates with the passage 165, then this passage will be connected to the passage 164, all as shown in Figure 42. On the other hand, if the valve element should be positioned so that the slot 142 is connected with the passage 165, then communication from the passage 164 will be cut off and passage 165 placed in communication with the suction manifold, all as shown in Figure 38. Whenever the passage 165 is connected to the suction manifold the forward chamber 154 of the suction motor will be exhausted of air and the diaphragm moved to the left to the position shown in Figure 38, pulling with it the plunger valve 147. Whenever the passage 165 is placed in communication with the passage 164, then the forward end of the suction motor will be in communication with atmosphere and consequently the spring 155 will be effective to move the valve plunger to its position as shown in Figure 42. It is thus seen by the structure that the valve plunger is controlled by the suction motor 150 and the suction motor in turn is controlled by the valve element 140. Thus there is power means to control the valve plunger which requires considerable movement between its two positions shown in Figures 38 and 42. On the other hand, to bring about this movement there need only be a slight rotation of the valve element 140 as will be apparent from Figures 38 and 42 which show the two positions the valve element is capable of assuming.

The valve element 140 is arranged to be controlled by the accelerator mechanism of the engine. As shown in Figure 1 and also Figures 35 to 44, this accelerator mechanism comprises a pedal or treadle 168 pivotally secured to the floorboards 169 in the operator's compartment. The treadle is connected by a rod 170, a bell-crank lever 171, and a rod 172 to an arm 173 which controls the butterfly valve 174 of the carburetor 136. The butterfly valve, as best shown in Figure 38, is mounted on a shaft 175 and on the outer end of this shaft the arm 173 is rotatably mounted. Adjacent the arm 173 there is secured to the shaft an arm 176 which extends rearwardly and alongside of an extension 177 on the arm 173. The outer end of the arm 176 carries a pin 178 which projects into an elongated slot 179 in the extension 177, thus enabling the arm 173 to have limited lost-motion before there is a movement of the arm 176 and the butterfly valve shaft. Between the pin 178 and the extension 177 is a very light spring 179' which normally tends to bias the pin to the lower end of the slot 179. The arm 176 carries a short extension 180 which cooperates with a stop pin 181, this stop pin determining the closed position of the butterfly valve.

In addition to the spring 179', there is also provided, as shown in Figures 1 and 59, a relatively strong spring 171' which acts on the bell-crank lever 171 to hold it against a stop 171'' and to also determine the fully released position of the accelerator pedal. The spring 171' can easily overcome the lighter spring 179' and when the bell-crank lever is held against the stop 171'' by the spring 171' the arm 173 will be positioned so as to stretch the spring 179' and move the arm 173 so that the pin 178 will be in the upper end of the slot 179, said pin being incapable of becoming pulled downwardly by the spring 179' due to the fact that the stop 181 is engaged and thus prevents any further counter-clockwise rotation from the positions shown in Figures 38, 39, 42 and 43.

When the accelerator mechanism is in its normally fully released engine idling position, the butterfly valve will be closed and the connecting parts between the rod 172 and the butterfly valve will be as shown in Figure 38. When the accelerator pedal is initially depressed there will be no movement of the butterfly valve, but there will be a movement of the arm 173 relative to the arm 176, which movement will be accommodated by the relationship of the pin 178 and the elongated slot 179. After this free movement has taken place then the butterfly valve will be moved in unison with the arm 173, actuated by the accelerator pedal. This free movement of the accelerator pedal from its fully released position to the position wherein it begins to open the butterfly valve is employed to control the valve 140 in a manner to now be described.

The valve element 140 is provided with a stub shaft 182 which extends through the cover plate 183 closing the valve bore 139 and to the outer end of this stub shaft is secured an actuating cam member 184 shown per se in Figure 40. This member is provided with diverging flat surfaces 185 and 186 on its forward edge and a notch 187 on its lower edge. The flat surfaces 185 and 186 are arranged to cooperate with a positioning leaf spring 188 secured to the cover 183. When the leaf spring is cooperating with the surface 185 the valve element 140 will be in the position shown in Figure 42 and when the valve element is turned so that the leaf spring can engage the flat surface 186, the valve element will be held in the position shown in Figure 38. The notch 187 in the member 184 is employed for turning the valve and to bring about this turning the pin 189 which connects the rod 172 to the arm 173 is provided with an extension portion to be received in the notch 187.

When the accelerator pedal is in its fully released position the pin will have engaged the forward portion of the notch 187 in the member 184 and turned it to the position where the leaf spring will engage the flat surface 185. This will place the valve element 140 in the position shown in Figure 42. As the accelerator pedal is initially depressed from its fully released position and during the time that the arm 173 is moved relative to the arm 176 and prior to operating the butterfly valve, the rear portion of the notch 187 will be engaged by the pin 189 and the member 184 turned so as to place the leaf spring 188 in engagement with the flat surface 186 and turn the valve element 140 to the position shown in Figure 38.

It is thus seen that with this control the valve element 140 can be moved without any movement of the butterfly valve. When the accelerator pedal is fully released the butterfly valve will be closed and the valve 140 placed in its position shown in Figure 38 to thereby cause the suction motor to operate. When the accelerator is initially depressed and before the opening of the butterfly valve of the carburetor the valve 140 will be placed in its other position shown in Figure 42 where the spring 155 can move the valve plunger rearwardly. When the accelerator is released from an engine operating position the butterfly valve will first become closed and then the valve element 140 again returned to its position corresponding to the fully released position of the accelerator, which position is shown in Figure 38.

*Power-actuated clutch control mechanism*

The main clutch 4 is arranged to be controlled by the same fluid motor 111 which changes the second and high speed ratios. As shown in Figures 1, 4, 6 and 31 to 33, the outer end of the clutch shaft on the servo-mechanism side of the housing has secured thereto a forwardly extending arm 190 carrying on its end a roller 191. This roller is arranged to cooperate with an extension 192 formed as an integral part of the bell-crank lever 120 and on the edge of this extension is a cam surface 193 which unites with a curved surface 194 having a center coinciding with the axis of the bell-crank lever pin 121. When the clutch is allowed to engage the roller will be at the base of the cam surface 193 and under these conditions the piston of the fluid motor will be at the rear end of the cylinder. This condition is shown in Figure 33. When the piston is moved toward the forward end of the cylinder of the fluid motor 111, the cam surface 193 will force the arm 190 and the clutch shaft in a counter-clockwise direction, thereby causing a disengagement of the main clutch. When the roller cooperates with the curved surface 194 the clutch will be maintained disengaged and the piston of the fluid motor will be free to complete its travel to the forward end of the cylinder. The disengaging of the clutch takes place during the initial travel of the fluid motor piston from the rear wall towards the forward wall of the cylinder. During the clutch disengagement there will be no substantial movement of the shifter plate 71 by operation of the bell-crank lever, since during the clutch disengaging movement of the bell-crank lever the rod 123, which forms a connection between the bell-crank lever and the shifter plate, merely moves from the lower side of the bell-crank lever pivoted to the upper side, as can be readily ascertained from Figures 33 and 32 respectively. Thus the clutch will be disengaged before there is any movement of the shifter plate to neutralize either second or high speed gear ratio, whichever may be established. The neutralizing of second or high speed gear ratio will take place after the clutch is disengaged.

In connection with the re-engaging of the clutch 4, the previously described yieldable connection between the rod 123 and the shifter plate 71 and comprising the spring 129, has a very important function. It is to be noted that during the re-engaging of the clutch, such takes place when the rod 123 is being moved from its position indicated in Figure 32 to its position indicated in Figure 33. This is the movement of the rod which results in the over-center action as the rod passes from the upper side of the axis of the pin 121 to the lower side and the spring 129 is compressed. In order to compress the spring during this movement, the force necessary to bring about the compressing is obtained from the fluid motor and consequently this will retard the movement of the piston of the fluid motor as it approaches the rear end of the cylinder and at the time the clutch plates are beginning to contact. This retarding action is effective in allowing for a slow rate of engagement of the main clutch plates, thereby producing smooth clutch engagement and preventing clutch "grabbing," thus giving equivalent "feather" engagement obtained when the clutch is manually controlled during engagement by the foot of the operator, as is done with present manual clutch control.

The retarding action of the spring 129 is effective at all times whenever the clutch is being engaged, regardless of the condition of the gearing, for reasons already set forth.

On the outer end of the clutch shaft 7 beyond the arm 190 is pivotally mounted the usual clutch pedal 195. The clutch pedal, at its hub, is provided with lugs 196 which are arranged to cooperate with lugs 197 carried by the hub of the arm 190. These lugs are so arranged that when the clutch is engaged and the clutch pedal is normally held released by its clutch pedal release spring 198 (see Figure 1) connected between the clutch housing and a downwardly extending arm 199, the lugs 196 will be slightly spaced behind the lugs 197. Thus if the clutch pedal should be depressed the lugs 196 will move and then pick up the lugs 197 and thereby rotate the clutch shaft 7 and cause the clutch to be disengaged solely by foot operation. However, whenever the clutch is disengaged by the power cylinder 111, the arrangement of the lugs is such that each lug 197, rotatably with the clutch shaft, will merely move away from its cooperating lug 196 and there will be no movement of the clutch pedal simultaneously with the power-disengaging of the clutch.

Since the fluid pressure operated motor 111 is arranged to be controlled by the accelerator mechanism and the control valve means C is conditioned for causing fluid motor piston operation each time the accelerator pedal is fully released or initially depressed, provision must be made to prevent fluid motor operation except when such is desired. If this were not done there would be a clutch operation, together with a neutralizing of an established gear ratio and a re-establishment of said ratio, each time the accelerator pedal was released and depressed, which, of course, is undesirable particularly where the operator desires to maintain an established gear ratio as in driving in high speed gear ratio. Furthermore, it is undesirable to disengage the clutch each time the accelerator pedal is released because engine compression-braking is sacrificed, which places the control of the vehicle solely on the operator. The disabing of the operation of the fluid motor whenever high or second speed gear ratio is established is accomplished by special locking mechanism which is best shown in Figures 31 to 33. The locking mechanism is arranged to lock the piston of the fluid motor at the rear end of the cylinder which position establishes either second or high speed and permits the clutch to be engaged.

Pivotally mounted on the extreme outer end of the clutch actuating shift is a locking arm 200 which extends forwardly to a point below the pivot pin 121 of the bell-crank lever. On the outer end of this arm is a hook 201. In order that the arm 200 may always be caused to move in a clockwise direction with the clutch pedal 195 when it is depressed, the hub of the arm carries a flange 202 which overlies the arm 199 extending downwardly from the clutch pedal and to which the return spring 198 is connected. The hook 201 of the arm 200 is arranged to cooperate with a shoulder 203 which is carried on a lateral part of the hub portion of the bell-crank lever so as to move with the bell-crank lever. The relationship between the hook 201 of the arm 200 and the shoulder 203 is such that whenever the piston reaches the rear end limit of its travel the hook can engage the shoulder and prevent any forward movement of the fluid motor piston. This locking relationship is shown in Figure 30.

If it should be desired at any time to manually unlock the hook of the arm from the shoulder, such can be accomplished by merely slightly depressing the clutch pedal, as will be accommodated by the reationship of lugs 196 and 197. By doing this the arm 200 will be turned in a clockwise direction with the clutch pedal and the hook released from the shoulder. When the locking arm is unlocked, then the piston of the fluid motor will be free to move forwardly to bring about a disengagement of the clutch and a neutralization of an active speed gear in the manner already apparent. This will happen if the accelerator pedal is released as valve V is then propery positioned to cause the fluid motor piston to move forwardly.

Since it is desired to also employ the fluid pressure operated motor 111 to disengage and partially or wholly control re-engagement of the friction clutch 4 during all gear shifting, including low and reverse gear speed ratios, provision is made to insure that the locking arm will not function to hold the clutch engaged whenever low or reverse speed is established or the gearing is neutralized. The releasing means employed is also arranged so that whenever the gear shifting lever is in neutral position, that is, the "N" position of the pointer, the locking arm will be unlocked. By this latter control if either second or high speed should be established and locked by the locking means, then by merely moving the gear shift lever from its second or high speed position to neutral position, the locking arm will automatically be unlocked and if the accelerator pedal should be fully released the piston of the fluid motor will quickly move from the rear end of the cylinder and automatically bring about a clutch disengagement and a neutralizing of the second or high speed to thus make the gearing condition correspond with the position of the gear shift lever.

As shown in Figures 1, 31, 32 and 33, the arm 199 which extends downwardly from the clutch pedal has mounted thereon for movement with the pedal the small suction-operated motor 204 comprising two cup shaped housing elements 205 and 206, between which is clamped a diaphragm 207. A U-shaped link 208 connects this diaphragm with the locking arm 200, said arm having a link connecting bracket 208'. A spring 209, interposed between the diaphragm and the end of the casing 205, acts to normally bias the diaphragm and the locking arm 200 to a condition where it is ready for automatic locking whenever the shoulder 203 is presented for engagement with the hook 201 of the locking arm.

The chamber formed by the diaphragm and the casing 205 is connected by a conduit 210 which leads to a control valve L which is controlled by the gear shift lever and mounted at the lower end of the steering column. From this valve L there is another conduit 211 which is connected with the suction manifold of the engine, the connection being made through passages 137 and 137' in the spacer extension 135 from the valve casing 134 of the control valve C as shown in Figures 35 and 59.

The valve L is shown in detail in Figures 45 to 50 and the casing of this valve is a part of the previously mentioned casing 48 mounted on the lower end of the steering column. The casing 48 is provided with a bore 212 in which is positioned a cylindrical valve element 213, surrounded by a fixed sleeve 214 pressed in the bore. The outer end of the valve element has a flange portion 215 and cooperating therewith is a snap spring 215 for holding the valve element in the bore. The outer end of the valve element also has a gear 216, the teeth of which cooperate with teeth 217 of the previously referred to sector gear 58 carried on the lower end of the gear shift lever actuated steering column shaft 43. The teeth of the gear 216 are of such length as to accommodate the reciprocation of the shaft 43 without unmeshing the teeth 217 therefrom. Thus the rotation of the shaft 43 also rotates the valve element 213.

The sleeve 214 has a port 218 which connects with the conduit 211 and another port 219 which connects with the conduit 210. The particular construction of the valve element is shown in Figures 47 to 50 and comprises an annular groove 220 which is arranged to be in constant communication with port 218 to which conduit 211 is connected. Extending from groove 222 are axial grooves 221, 222 and 223 arranged to selectively cooperate with the port 219 to which the conduit 210 leading to the small suction motor 204 is connected. Between the axial grooves 221 and 222 is a port 224 and between the grooves 222 and 223 is a port 225. These ports 224 and 225 communicate with an axial passage 226 extending through the valve element so as to place the ports in constant communication with atmosphere. The casing 48 has a cover 227 provided with a breather cap 228 to accommodate ingress and egress of air with respect to the casing. The ports 224 and 225 are arranged to cooperate with the port 219 in the sleeve and when either of said ports 224 and 225 so cooperate, the suction motor 204 will be in communication with atmosphere. Whenever any of the recesses 221, 222 and 223 cooperate with the sleeve port 219, the suction motor will be in communication with the intake manifold of the engine and the diaphragm will be pulled downwardly against the bias of the spring 209 to thus unlock and maintain unlocked the locking arm.

As has already been described, the gear shift lever and the shift control shaft 43 have five different rotative positions; namely, the central or neutral position with the second and low positions on one side thereof, and the high and reverse positions on the other side thereof. The connection between the shaft 43 and the valve element 213 is such that whenever the shift lever is in the "N" position, the recess 222 will be in communication with the port 219, thereby causing the suction motor to be operated and the locking arm to be unlocked. When the gear shift lever is in the low speed drive position the recess 221 will be in communication with the port 219 and when the gear shift lever is in the "R" position the recess 223 will be in communication with the port 219. All of these positions insure that the suction motor will be operated since then the motor is connected to the source of suction. Thus it is seen that the locking arm 200 cannot in any way function to prevent reciprocation (to and fro movement) of the fluid motor piston whenever the gear shift lever is in the "N" position or is moved to establish either low speed or reverse speed.

When the gear shift lever is placed in the second speed ratio position the atmospheric port 224 will be in communication with the sleeve port 219 and when the gear shift lever is in high speed drive position the atmospheric port 225 will be in communication with the sleeve port 219. Under these conditions there will be no communication between the source of suction and the suction motor, but the suction motor will be in communication with the atmosphere, thus enabling the spring 209 to bias the locking arm 200 to a position to where it will be ready to automatically lock the piston of the fluid motor 111 in its rear position, which position corresponds to the clutch being engaged and a gear ratio established.

Thus if the gear shift lever should be placed in the second or high speed position and one of these speeds established as a result of depressing the accelerator pedal to cause the piston of the fluid motor 111 to move to the rear end of its cylinder, the established speed will be maintained by the automatic functioning of the lock 200. There will thus be no possibility of the fluid motor again functioning, regardless of the release of the accelerator pedal, as long as the gear shift lever remains in the position indicating the speed effective. However, as soon as the gear shift lever is moved to indicate neutral, then the small suction motor 204 will immediately function to unlock the locking arm 200, considering, of course, that the accelerator pedal is fully released. The piston of the suction motor will then be moved forwardly and thereby disengage the clutch and then neutralize the gearing in the manner already described.

*Manually-variable clutch engaging control*

Referring again to the restricting valve S which is interposed between the conduits 132 and 133 forming the connection between the rear end of the fluid motor and the source of suction, this valve has for its purpose the restricting, under certain conditions, of the volume of air which can pass through the two conduits. The valve S is shown in detail in Figures 8, 15, 15-A and 15-B and its control mechanism is shown in various other views, including Figures 1, 3 and 13. The valve has a cup shaped casing 229 provided with a sleeve 230 which is pressed into the bore. This sleeve has a round port 231 with which the conduit 132 is connected. Opposite this round port is a square port 232 with which is connected the conduit 133. Within the sleeve is a hollow cylindrical valve element 233 having a semi-annular slot 234 for cooperation with the round port 231 to thus maintain this port in constant communication with the interior of the valve element. The valve element, diametrically opposite the slot 234, has a central rectangular slot 235. On opposite sides of this rectangular slot 235 are two smaller rectangular slots 236 and 237, each of which has approximately one-half the area of the slot 235. All of the slots 235, 236 and 237 are arranged to selectively cooperate with the rectangular port 232 to thus permit communication between conduits 132 and 133. Maximum flow of air through the valve is provided when the rectangular slot 235 is in communication with the rectangular port 232. When either of the two smaller slots 236 and 237 are in communication with the rectangular port 232, there will be a restricted flow of air through the conduits 132 and 133. The restricting valve also acts as a safety valve to prevent operation of fluid motor 111 before either low or reverse speed is fully established or neutralized, it being noted that slots 235, 236 and 237 will not register with port 232 until the gearing has been properly conditioned.

The valve element 233 is provided with a short shaft 238 which extends to the exterior of the casing 229 and secured to the outer end of this shaft is an arm 239 provided with a slot 240 in its free end. The valve S is arranged to be directly above the shaft 26 which carries the arm 105 and this arm 105 has an upwardly extending extension 241 which carries a pin 242 for reception in the slot 240 of the arm 239. By this connection between the shaft 26 and the valve element 233 of the valve S, the valve element can be controlled in accordance with the position of the shaft 26, it being recalled that this shaft carries the low and reverse gear shifting fork and has three positions corresponding to neutral, low and reverse speed drives. The connection between the shaft 26 and the valve is such that when the shift is to the position wherein either low or reverse speed is established, the large rectangular slot 235 will be opposite the rectangular port 232 and the valve will not function to restrict flow of air through the conduits 133 and 132. However, if the shaft 26 is positioned to establish either low speed or reverse speed, the valve element will be positioned so that there will be a restricted flow of air through the conduits since then either of the smaller rectangular slots 236 or 237 will be opposite the port 232.

The purpose of restricting the flow of air through the conduits 132 and 133, when low speed drive or reverse speed drive is established, is to decrease the rate of withdrawal of air from the rear end of the fluid motor 111. It is to be recalled that it is when the piston of the fluid motor moves from the forward end to the rear end of the fluid motor the main clutch 4 is controlled to re-engage. It is also to be recalled that whenever low or reverse speed gear is manually established the shifter plate for the second and high gear driving is disengaged from the shaft 59 which is rotated by the piston of the fluid motor through the rod 123. Therefore, when low and reverse gear drives are established, the fluid motor functions only to disengage and control re-engagement of the clutch 4. The clutch is disengaged whenever the accelerator pedal is fully released and controlled into re-engagement when the accelerator pedal is initially slightly depressed. In starting the car from a standstill, it is desirable to "feather" the clutch to a greater extent than when shifting between low and second speeds or second and high speeds, since under the former conditions the vehicle is stopped and if the clutch should grab, a jerky start results. Therefore, it is desirable to give the clutch a slower rate of engagement when starting and this is accomplished by the valve S.

When low and reverse speed drives are established the restricting function of the valve S is present and therefore the rear end of the suction motor will not be exhausted of air as rapidly as under other conditions. Consequently the piston of the fluid motor will move more slowly toward the rear of the fluid motor and thus there will be a slower rate of clutch re-engagement. This slower rate, caused by the restricting valve S, is in addition to the retarding action caused by the spring 129 associated with the gear shifting link 123 and present each time the clutch is engaged, regardless of which gear ratio is established.

Hydraulic dash-pot clutch engaging control

Even with the restricting valve S functioning, together with the retarding action of the spring 129 resulting from the relationship between the rod 123 and the bell-crank lever, it is also desirable to additionally control the retardation of the re-engagement of the clutch by means which will be effective at all times and regardless of which speed is being established. This means should be independent of the fluid motor so as not to be affected in any way by varying rates of depressing movement of the accelerator pedal. The additional means I have employed comprises a dash-pot generally indicated by the numeral 243 and associated with the end of the clutch shaft on the side of the vehicle opposite the fluid motor 111. As shown in Figures 4, and 55 to 58, this dash-pot comprises a cylinder 244 pivotally mounted at its lower closed end on a bracket 245 secured to the clutch housing 2. Within the cylinder is a piston 246 having a piston rod 247 which passes through the detachable cylinder head 248 and connected to an arm 249 secured to the outer end of the clutch shaft 7. The piston is provided with a plurality of holes 250, shown as eight in number, which permit liquid within the cylinder to pass from one side of the piston to the other. Associated with the forward face of the piston is a valve plate 251 which is provided with a fewer number of holes 252, shown as four in number. This valve plate is slidable on a forward extension of the piston rod and is biased towards the piston face by a very light spring 253. The plate is prevented from turning with respect to the piston by means of a pin 254 on the piston rod and a cooperating slot 255 carried by the hub of the plate. When the plate is against the face of the piston the four holes 252 will be opposite four holes 250 and the remaining four holes 250 will be blocked. Thus it is seen that when the plate engages the face of the piston there is restricted by-passing of liquid past the piston. This restricted by-passing will be present whenever the piston moves from the upper end of the cylinder towards the lower end. However, when the piston moves from the lower end of the cylinder toward the upper end the plate will not function to do any restricting as then liquid acts on the plate through the covered holes 250 and forces the plate away from the face of the piston against the very light spring 253. Consequently all of the eight holes 250 will be open and thus accommodate liquid to by-pass the piston freely.

The dash-pot piston rod 247 is so connected operatively to the clutch 7 shaft that when the clutch is engaged the piston 246 will be at the lower end of the cylinder and when the clutch is disengaged the piston will be at the upper end of the cylinder. As the piston moves from the engaged position of the clutch to the disengaged position the dash-pot will not function to retard the disengaging of the clutch, since under these conditions all of the holes 250 will be open and thus accommodate free by-passing, all as indicated in Figure 56. However, when the clutch is released to re-engage the piston will move downwardly and there will be a restriction of the by-passing of liquid past the piston. Consequently a retarding action will be created on the clutch and thus aid in providing for a slow rate of engagement of the clutch independently of the fluid motor 111 and rate of movement of its piston 117.

The dash-pot retarding action will always be present each time the clutch is released to re-engage. The retarding action created by the spring 129, together with the rod and bell-crank lever arrangement, will also be present each time the clutch is released to engage, but this retarding action will be effective only during the latter stages of the clutch re-engagement since it does not come into effect until the piston 117 of the fluid motor 111 approaches the rear wall of the suction motor. The retarding action created by the restricting valve S will only be present whenever the clutch is released to re-engage after low or reverse speeds have been established. Thus it is seen that the dash-pot and spring 129 act to retard engagement of the clutch at all times and they are aided by the functioning of the restricting valve S when low and reverse speeds are established.

*Operation*

Referring to the operation of the above described control mechanism, the parts thereof will be in the position shown in Figures 1 to 12, inclusive, 15, 16, 28, 31, 35 to 39, inclusive, 45 to 48, inclusive, 51 to 54, inclusive, 56 and the schematic view of Figure 59 when the gearing is in neutral condition, the engine operating at idling speed, and the accelerator pedal fully released. With the accelerator pedal fully released the control valve C will be in the position shown in Figure 38 and under these conditions the fluid motor 111 will be so operated as to disengage the primary clutch 4. The restricting valve S will be conditioned as shown in Figure 15 and the valve L at the lower end of the control shaft will be conditioned as shown in Figures 45 to 48, inclusive, thereby causing operation of the small suction motor 204 to release the locking arm 200 as shown in Figure 32. Since the fluid motor 111 is operated to disengage the clutch, the shifter plate 71 will be in its forward position and the double arm lever 82 in its vertical neutral position.

If it should now be desired to move the vehicle forwardly in low speed gear, all that needs to be done is to raise up on the gear shift lever 53 and then swing it downwardly so as to place the pointer opposite the numeral "1" on the indicator. Following this the accelerator pedal is depressed and the vehicle moves forwardly in low gear. The moving of the gear shift lever causes low speed to be manually established, which establishment is brought about by a rotation of the member 30 carrying the gear segment 31 to the position shown in Figure 17. Rotation of the gear segment 31 also rotates the sector gear 32 and this gear will pick up the sector arm 35 and rotate the shaft 26. This shifts the combined low and reverse gear 15 into mesh with the gear 12. The relationship of the sector arm and the shaft 26 when low speed is established is as shown in Figures 17 and 29. Initial depression of the accelerator, after setting the gear shift lever, will cause the control valve means C to be conditioned as shown in Figure 42 and this is accomplished prior to the speeding up of the engine. As the accelerator pedal is initially depressed, the valve element 40 will be turned from the position shown in Figure 38 to the position shown in Figure 42, thereby causing the small suction motor 150 to be operated to move the plunger valve 147 to the position shown in Figure 42. The fluid motor 111 will now be so connected to the suction source that its piston will be caused to move to the rear end of the cylinder 112 and thereby release the main clutch for engagement. As the accelerator is now depressed further to speed up the engine the vehicle will move ahead in low speed.

The establishing of the low speed by the gear shift lever will place the restricting valve S in the condition shown in Figure 15–A. Therefore as the fluid motor 111 is operated to release the clutch for engagement, the withdrawal of air from the rear end of the suction motor will be made at a slower rate than when the valve S is in the condition shown in Figure 15, thereby causing the clutch to be slowly engaged. The dash-pot 243 will also be effective in retarding the engagement of the clutch. When the clutch is about to engage, the over-center action between the rod 123 and the bell-crank lever 120 will come into play, thus compressing the spring 129 and further retarding the engagement of the clutch in the manner already described.

It is to be remembered that during clutch reengagement the shifter plate 71 will not be moved rearwardly, since when the low speed is established the lever 61 will be disconnected from the shaft 59 and the shaft will have free rotation until the end of the circumferential portion of the L-shaped slot 63 is reached (Figure 14), whereas the shifter plate will be moved slightly so as to bring the pin 70 into engagement with the end of the leg 88 of the interlocking plate. From this point on the spring 129 will be compressed to retard clutch engagement as the over-center action continues functioning. When low speed is established, the locking arm 200 will not be operable to lock the clutch engaged, since the valve L will be so conditioned when the gear shift lever is in the low gear establishing position as to continue to cause the small suction motor 204 to be operated to hold the locking arm in disengaged position.

If reverse speed should be desired to be established when the vehicle is stopped with the engine running and the accelerator pedal fully released, this is accomplished in the same manner as low speed was established, except that the gear shift lever while raised is set in the position wherein the pointer indicates "R" before the accelerator pedal is depressed. By setting the gear shift lever in the "R" position, the combined low and reverse gear 15 will be moved to engage the gear 15 with the low speed gear 12. The positions assumed by the segment gear, the sector gear, the sector arm and other parts when reverse speed gear is established, are shown in Figure 20. After reverse speed is established the clutch is caused to engage by the depressing of the accelerator pedal. The movement of the piston of the suction motor 111 to release the clutch for reengagement will be retarded in the same manner as when the clutch was engaged after low speed was established, since the restricting valve S will be positioned to restrict the withdrawal of air from the suction motor. The spring 129 and the dash-pot also function to retard the clutch engagement. The functioning of the spring results from the shifter plate being disconnected from the shaft 59 and the interlocking plate 87 functioning to prevent movement of the shifter plate and also act as a stop after the shifter plate is engaged by the pin and L-shaped slot arrangement and thereby causing the over-center action to be effected.

If it is assumed that the vehicle is driving in low speed ratio and it is desired to change to second speed, all that needs be done is to fully release the accelerator pedal and then rotate the gear shift lever so that the pointer is at the lower "N" position and then reverse the movement of the lever to place the pointer in the "2" or second speed indicating position. The release of the accelerator pedal will place the control valve means C in the condition shown in Figure 38 which will then cause the piston of the suction motor 111 to move to the forward end of its cylinder. The clutch will then be disengaged so that low speed can be manually neutralized by moving the gear shifting lever from the "1" position to the "N" position. As the gear shifting lever is moved from the "N" position to the "2" position, the member 30 will be rotated to the position shown in Figure 18. This rotation of the member 30 causes rotation of the gear segment 31 and sector gear 32, but there will be no movement of the shifting fork of the low and reverse speeds since the sector arm is not connected to the sector gear 32 during this movement. When the member 30 is rotated to the position shown in Figure 18, cam surface 79 of the selecting cam 78 will be presented for cooperation with the pin 76 on the shifter link, thus setting it so as it will be guided into the notch 83 of the double arm lever 82. This is the selecting operation for second speed and it is done solely by the gear shift lever. Second speed or intermediate drive is now ready to be established and this is brought about when the accelerator pedal is depressed.

Initial depressing of the accelerator pedal will condition the control valve means C to the position shown in Figure 42, thereby connecting the rear end of the fluid motor 111 to the atmosphere. Movement of the piston to the rear end of the motor will now take place and the air being exhausted from the rear end of the motor will not be restricted by the valve S since it is in the position shown in Figure 15, due to the fact that the low and reverse speeds are neutralized. The movement of the piston of the fluid motor toward the rear end of the cylinder will cause a rearward movement of the shifter plate 71, due to the fact that the lever 61 is connected to the shaft 59, this connection being re-established when the low speed gear was neutralized, enabling the spring 65 to function to place the pin 64 in the axial portion of the L-shaped slot 63 of the hub of lever 61. As the shifter plate is moved rearwardly, the shifter link will be carried therewith and the pin 76 engaged with the notch 83 in the double arm lever, thereby giving the double arm lever a clockwise rotation as viewed in Figure 18. This clockwise rotation of the double arm lever will result in the shifting fork 20 moving the double clutch element 18 to connect the second speed gear 17 to the driven shaft, thereby establishing second speed drive.

The establishment of second speed is accomplished before the clutch is released to initially re-engage by the roller 191 riding down the cam surface 193 of the extension on the bell-crank lever 120. The position of the connecting parts between the fluid motor 111, clutch 4 and the gearing 3 when the second speed is established, but the clutch has not engaged, is shown in Figure 32. After the second speed has been established the over-center action between the bell-crank lever and the rod 123 will then come into operation as the clutch begins to engage. This will cause the spring 129 to retard the continuing movement of the fluid motor piston 117 towards the rear wall of the cylinder and such working in conjunction with the dash-pot will give proper "feathering" of the clutch plates. The "feathering," however, will not be as pronounced as when the clutch is engaged after low or reverse speed is established since then, in addition to the spring 129 and the dash-pot, there is present the functioning of the restricting valve S.

When the clutch is fully engaged the piston 117 of the fluid motor 111 will become automatically locked at the rear end of the cylinder by the engagement of the locking arm 200 with the shoulder 203. This condition is shown in Figure 33. This automatic locking results from the positioning of the gear shift lever in the "2" position. Under these conditions the valve L will be so conditioned that the suction motor 204 will be connected to atmosphere, thus releasing the spring 209 to swing the locking arm upwardly so as to condition it for automatic engagement with the shoulder 203 when such becomes properly positioned upon clutch engagement. The operation of the fluid motor 111 in controlling engagement of the clutch takes place before the engine is speeded up to any appreciable extent, as has already been noted. After the control valve means C has been conditioned, as shown in Figure 42, by the initial depressing of the accelerator pedal, the engine will be speeded up by the opening of the butterfly valve 174 associated with the carburetor and since there is engagement of the clutch the vehicle will continue forwardly in second speed gear.

After second speed gear is obtained, release of the accelerator pedal will not cause any functioning of the fluid motor 111 since its piston is locked in the rearward position shown in Figure 33. Therefore the clutch will remain engaged and second speed established irrespective of the extent or mode of manipulating the accelerator pedal. This condition will prevail as long as the gear shift lever remains in position indicating second speed, that is, the "2" position.

If it should be desired to obtain high speed, or direct drive, such is accomplished by releasing the accelerator pedal and then moving the gear shift lever from the "2" position to the "3" position. When the gear shift lever reaches the "N" position during its movement, the valve L will be so conditioned that the suction motor 204 will be operated. This will cause unlocking of the locking arm 200 and when this happens the piston 117 of the fluid motor 111 will immediately move forwardly from the rear end of the cylinder to the forward end and cause a disengagement of the main clutch 4 and a shifting forwardly of the shifter plate 71. The movement of the piston forwardly results from the released position of the accelerator mechanism which conditions control valve means C as shown in Figure 38. The clutch will be disengaged first and then as the shifter plate is moved forwardly, the second speed gear will be neutralized, which is accomplished by the V-shaped block 86 engaging the notch 85 in the double arm lever 82 and moving it to its vertical position, all as shown in Figure 11.

As the gear shift lever reaches the "3" position, two operations will occur. One will be that the selecting cam 78 will be positioned as shown in Figure 19 so as to present the cam surface 80 for cooperation by the pin 76 in order that when the shifter plate and shifter link are moved rearwardly the pin 76 will engage the notch 84 and give the double arm lever a counter-clockwise rotation to the position shown in Figure 19. The second operation is that the gear shifting lever so controls the valve L that the small suction motor 204 will be caused to become inoperative so that the spring 209 can function to again place the locking arm in a position to automatically engage with the shoulder 203 when such is presented by a rearward movement of the piston of the fluid motor 111.

Thus with the gear shifting lever in the "3"

position, the high speed will now be ready to be established and the main clutch 4 again re-engaged merely by depressing the accelerator pedal. This will so set the control means valve C that the piston of the fluid motor will be moved rearwardly and first cause a rearward movement of the shifter plate to thereby establish high gear ratio. This results from such a movement of the double arm lever as to cause the double clutch element 18 to be moved forwardly and directly connect the driving and driven shafts of the gearing. After this is done the continued rearward movement of the piston will cause the main clutch 4 to become engaged. When the piston of the fluid motor 111 reaches the rear end of the cylinder the locking arm 200 will engage the shoulder 203 and lock the clutch engaged and the high speed gear established. As the engine is speeded up by the continued depressing of the accelerator pedal, the vehicle will continue forwardly in high speed. High speed drive will continue to be established and the main clutch 4 held engaged, regardless of how many times the accelerator pedal is released, provided of course that the gear shift lever remains set in the numeral "3" position.

If it should be desired to again shift back to second speed from high speed, such can be accomplished by fully releasing the accelerator pedal, moving the gear shifting lever from the "3" position to the "2" position and then depressing the accelerator pedal. It is believed to be obvious from what has already been described with respect to establishment of second speed as to how second speed will again be re-established. The moving of the gear shift lever to the "N" position will result in the high speed being neutralized and then second speed selected when the numeral "2" position is reached. Subsequent depressing of the accelerator pedal will then establish second speed and bring about a re-engagement of the engine clutch 4. Second speed will be maintained established and the clutch 4 engaged by the functioning of the locking arm 200. To go back to high speed, the gear shift lever need only be shifted back to the "3" position while the accelerator pedal is fully released and then the accelerator pedal depressed.

If at any time while second or high speed drives are established it is desired to merely disengage the main clutch 4 and neutralize the gearing 3 without changing the setting of the gear shift lever from the indicated speed, such can be accomplished by merely "tapping" the clutch pedal 195. When this is done the locking arm 200 will be released from the shoulder 203 and since the accelerator pedal is released, the fluid motor 111 will be caused to function to first disengage the clutch 4 and then neutralize the gearing in the same manner as if the locking arm had been released by moving the gear shift lever to the "N" position so as to cause the locking arm to be released by the suction motor 204. If the accelerator pedal is again depressed the indicated speed will again be re-established and the clutch engaged.

Whenever the gear shift lever is returned to the "N" position with either second or high speed established, the clutch 4 will always first be disengaged and then the active speed neutralized. Thus with the gearing set in either second or high speed and it is desired to obtain low or reverse speed, such is done by just moving the gear shift lever from either the "2" or "3" position to the "1" or "R" position respectively. As the gear shift lever reaches the "N" position the gearing will be neutralized after the clutch 4 is disengaged by the fluid motor 111. The movement of the gear shift lever from the "N" position to either "R" or "1" will now manually establish either of these speeds in a manner already described. When the accelerator pedal is again depressed the clutch 4 will be released to become engaged and the vehicle will move in a direction corresponding to which one of the above speeds is established.

From the foregoing description of the operation of my novel and improved control mechanism, it is obvious that the clutch 4 and the change-speed gearing 3 are efficiently controlled coordinately by very simple operations. There is no necessity for the operator to pedally disengage and re-engage the clutch 4. All he needs to do is to move the gear shift lever. The clutch operation is automatically accomplished, regardless of whether low and reverse speeds are being manually-controlled or second and high speeds are being power-controlled. The fluid motor 111 always functions to control the power-transmitting and interrupting clutch 4 and such results from normal manipulations of the accelerator pedal. The friction clutch 4 will be properly engaged at all times by the various controls employed to retard the clutch re-engagement according to the effective speed drive. For example, there will be a greater retarding of the engagement of the clutch after low and reverse speeds are established than after second and high speeds are established, which is the desirable operation. It is also to be noted that with my improved control mechanism only one mechanical connection is employed between the gear shift lever and the gearing 3. By means of this one connection low and reverse speed gear ratios can be manually established and neutralized and second and high speed gear ratios can be selected at will, and made effective automatically by power-operated means. The mechanism is also so constructed that even if there should be any failure of the fluid motor 111, the clutch 4 can nevertheless, be disengaged by operation of the clutch pedal 195.

It is to be understood that modifications and variations may be effected without departing from the scope of the novel concepts of the present invention as defined in the claims appended hereto.

I claim as my invention:

1. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise; power operated means connected to disengage the clutch, establish either of two speed drives and permit re-engagement of the clutch, selecting means for determining which of the two speed drives will be established, means for controlling the operation of the power means by the accelerator mechanism, locking means for automatically disabling operation of the power means when in a condition where the clutch is engaged and a speed drive is established and notwithstanding the accelerator mechanism is in its condition where the power means is caused to be energized, and means for causing the disabling means to become inoperative at will.

2. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise; power-operated means operably connected to disengage the clutch, establish either of two speed drives and control re-engagement of the clutch, selecting means for determining which of the two speed drives will be established, manual means for controlling the selecting means, means for controlling the operation of the power means by the accelerator mechanism, means for automatically disabling operation of the power means when in a condition wherein the clutch is engaged and a speed drive is established, and means for causing the disabling means to become inoperative by operation of the manual means which controls the selecting means.

3. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise power-operated means operably connected to disengage the clutch, establish either of two speed drives and control re-engagement of the clutch, selecting means for determining which of the two speed drives will be established, means controlling the operation of the power means by the accelerator mechanism, mechanical means for automatically locking the power means in a position wherein a speed drive is established and notwithstanding the accelerator mechanism is conditioned to cause energization of the power means, and means for unlocking the locking means at will.

4. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise power-operated means operably connected to disengage the clutch, establish either of two speed drives and control re-engagement of the clutch, selecting means for determining which of the two speed drives will be established, means for controlling the operation of the power means by the accelerator mechanism, means for automatically locking the power means in a position wherein the clutch is engaged and notwithstanding the accelerator mechanism is conditioned to cause energization of the power means and other power-operated means controllable at will for unlocking the locking means.

5. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise, power-operated means operably connected to disengage the clutch, establish either speed drive and control re-engagement of the clutch, selecting means for determining which of the two speed drives will be established, manual means having a neutral position and two other positions for placing the selecting means in its selecting position, means for controlling the operation of the power means by the accelerator mechanism, means for automatically locking the power means in a position wherein the clutch is engaged and a speed drive is established, and means for conditioning the locking means to be inoperative when the manual means is in its neutral position.

6. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise a fluid motor provided with a movable element, a source of fluid pressure different from atmosphere connected to the motor, connecting means between the element of the motor and the clutch for operably disengaging the clutch when the element moves in one direction and for controlling re-engagement when the element moves in the opposite direction, connecting means between the element of the motor and the gearing for establishing either of said speed drives when the clutch is disengaged, selecting means for determining which speed drive will be established, means for controlling the operation of the fluid motor by the accelerator mechanism and mechanical means operable independently of the accelerator mechanism control means for locking the element of the fluid motor in a position wherein the clutch is engaged.

7. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise a fluid motor provided with a movable element, a source of fluid pressure different from atmosphere connected to the motor, connecting means between the element of the motor and the clutch for operably disengaging the clutch when the element moves in one direction and for controlling re-engagement when the element moves in the opposite direction, connecting means between the element of the motor and the gearing for establishing either of said speed drives when the clutch is disengaged, selecting means for determining which speed drive will be established, means for controlling the operation of the fluid motor by the accelerator mechanism, means operable independently of the accelerator means for automatically locking the element of the fluid motor in a position wherein the clutch is engaged, and means for releasing the locking means at will.

8. In a vehicular drive system including a torque producing internal-combustion engine having an accelerator mechanism and a friction clutch for transmitting torque from the engine to a change-speed gear transmission providing a plurality of gear sets for establishing different forward speed drives; the improvements which comprise, a fluid motor provided with a movable element, a source of fluid pressure different from atmosphere connected to the motor, connecting means between the element of the motor and the clutch for operably disengaging the clutch when the element moves in one direction and for controlling re-engagement when the element moves in the opposite direction, connecting means between the element of the motor and the gearing for establishing either of said speed drives when the clutch is disengaged, manually-operated selecting means having a neutral position and two other positions for determining which speed drive will be established, means for controlling the operation of the fluid motor by the accelerator mechanism, means for automatically locking the element of the fluid motor in a position wherein the clutch is engaged, and other power-operated means controlled by the manually operated member for releasing the locking means when the manually operated selecting means is in the neutral position.

9. In a vehicular drive system including a torque producing internal combustion engine having an accelerator mechanism and a clutch for transmitting torque from the engine to a change-speed gear transmission providing a plurality of gear sets for establishing different speed drives; a fluid motor provided with a movable element operably connected to the gearing to establish either of two speed drives, a source of pressure different from atmosphere connected to the motor, selecting means for determining which speed drive will be established, means for controlling the operation of the motor by the accelerator mechanism, automatically operable locking means for maintaining the element of the motor in a position wherein a speed drive is established and thereby prevent its control by the accelerator mechanism, means for unlocking the locking means at will, and means operatively connecting said motor element to the clutch to effect clutch disengagement prior to speed drive neutralization and clutch re-engagement after establishment of a speed drive by movement of the motor element.

10. In a vehicular drive system including a torque producing internal-combustion engine having an accelerator mechanism and a clutch for transmitting torque from the engine to a change-speed gear transmission providing a plurality of gear sets for establishing different speed drives, manually-operated means for manually establishing and neutralizing one speed drive, power-operated means for operably disengaging the clutch and establishing either of two other speed drives, means controlled by the manually-operated means for selecting which speed drive of the two other speed ratios will be established without affecting the neutral condition of the one speed drive, means for controlling the operation of the power-operated means by the accelerator mechanism, means for locking the power-operated means in a condition wherein the clutch is engaged and a speed drive established to thereby prevent the power-operated means from being controlled by the accelerator mechanism, and means for releasing the locking means by the manually-operated means.

11. In a vehicular drive system including a torque producing internal-combustion engine having an accelerator mechanism and a clutch for transmitting torque from the engine to a change-speed gear transmission providing a plurality of gear sets for establishing different speed drives, manually-operated means for manually establishing and neutralizing one speed drive, power-operated means for operably disengaging the clutch and establishing either of two other speed drives, means for selecting which speed drive of the two other speed drives will be established, means for controlling the operation of the power-operated means by the accelerator mechanism, means for locking the power-operated means in a condition wherein the clutch is engaged and a speed drive established to thereby prevent the power-operated means from being controlled by the accelerator mechanism, and means for releasing the locking means at will.

12. In a vehicular drive system including a torque producing internal-combustion engine having an accelerator mechanism and a clutch having an actuating pedal and adapted for transmitting torque from the engine to a change-speed gear transmission providing a plurality of gear sets for establishing different speed drives; manually-operated means for manually establishing and neutralizing one speed drive, power-operated means, means operated by the power-operated means for establishing either of two other speed drives and including selecting means for determining which of said two other speed drives will be established, means for causing the power-operated means to operate and establish one of said two other speed drives when the accelerator mechanism is in a predetermined position, means for automatically locking the power-operated means in the speed drive established position and means for releasing the locking means by operation of the clutch pedal.

13. In a vehicular drive system including a torque producing internal-combustion engine having an accelerator mechanism and a clutch having a clutch pedal and adapted for transmitting torque from the engine to a change-speed gear transmission providing a plurality of gear sets for establishing different speed drives; manually-operated means for manually establishing and neutralizing one speed drive, power-operated means, means operated by the power-operated means for establishing either of two other speed drives and including selecting means for determining which of said two other speed drives will be established, means for causing the power-operated means to operate and establish one of said two other speed drives when the accelerator mechanism is in a predetermined position, means for automatically locking the power-operated means in the speed drive established position, means for releasing the locking means by operation of the clutch pedal and other means for releasing the locking means by the manually-operated means.

14. In a vehicular drive system including a torque producing internal-combustion engine having an accelerator mechanism and a clutch for transmitting torque from the engine to a change-speed gear transmission providing a plurality of gear sets for establishing different speed drives; manually-operated means for manually establishing and neutralizing one speed drive, power-operated means, means operated by the power-operated means for establishing either of two other speed drives and including selecting means for determining which of said two other speed drives will be established, means for manually operating at will the selecting means by the manually-operated means and without establishing the one speed drive, means for controlling the operation of the power-operated means by the accelerator mechanism, and means operatively connected to the power-operated means to effect clutch disengagement prior to speed drive neutralization and clutch re-engagement after establishment of a speed drive by operation of the power-operated means.

15. In a vehicular drive system including a torque producing internal-combustion engine having an accelerator mechanism and a clutch for transmitting torque from the engine to a change-speed gear transmission providing a plurality of gear sets for establishing different speed drives; manually-operated means for manually establishing and neutralizing one speed drive, power-operated means, means operated by the power-operated means for establishing either of two other speed drives and including selecting means for determining which of said two other speed drives will be established, means for manually operating at will the selecting means by the manually-operated means and without establishing the one speed drive, means for causing the power-operated means to operate and establish one of said two other speed drives when the accelerator mechanism is in a predetermined position, means for locking the power-operated means in the speed drive established position, means for releasing the locking means at will, and means operatively connecting said power-operated means to the clutch to effect clutch disengagement prior to speed drive neutralization and clutch re-engagement after establishment of a speed drive by power-operated means operation.

16. In a vehicular drive system including a torque producing internal-combustion engine having an accelerator mechanism and a clutch for transmitting torque from the engine to a change-speed gear transmission providing a plurality of gear sets for establishing different speed drives; manually-operated means for manually establishing and neutralizing one speed drive, power-operated means, means operated by the power operated means for establishing either of two other speed drives and including selecting means for determining which of said two other speed drives will be established, means for manually operating at will the selecting means by the manually-operated means and without establishing the one speed drive, means for causing the power-operated means to operate and establish one of said two other speed drives when the accelerator mechanism is in a predetermined position, means for locking the power-operated means in the speed ratio established position, and means for releasing the locking means by the manually-operated means, and means operatively connecting said power-operated means to the clutch for effecting clutch disengagement prior to speed drive neutralization and clutch re-engagement after establishment of a speed drive by operation of the power-operated means.

17. In a vehicular drive system including a torque producing internal-combustion engine having an accelerator mechanism and a clutch for transmitting torque from the engine to a change-speed gear transmission providing a plurality of gear sets for establishing different speed drives; manually-operated means for manually establishing and neutralizing one speed drive, power-operated means, control means operable by said accelerator mechanism for controlling operation of said power-operating means, means for operatively disengaging the clutch each time the power means is operated, other means operable by the power-operated means after disengaging the clutch for establishing another speed drive, and means operable when the one speed drive is established for disabling the other means and preventing the power-operated means when operated from establishing said other speed drive.

18. In a vehicular drive system including a torque producing internal-combustion engine having an accelerator mechanism and a clutch for transmitting torque from the engine to a change-speed gear transmission providing a plurality of gear sets for establishing different speed drives; power-operated means operably connected for disengaging the clutch, establishing a speed drive and subsequently accommodating re-engagement of the clutch, means operable in response to actuation of said accelerator mechanism for controlling the operation of the power-operated means, means for automatically locking the power-operated means in a position wherein the clutch is engaged and the speed drive is established, and means for releasing the locking means.

19. In a vehicular drive system including a torque producing internal-combustion engine having an accelerator mechanism and a clutch having an actuating pedal and being adapted for transmitting torque from the engine to a change-speed gear transmission providing a plurality of gear sets for establishing different speed drives; power-operated means operably connected for disengaging the clutch, establishing a speed drive and subsequently accommodating re-engagement of the clutch, means responsive to actuation of said accelerator mechanism for controlling the operation of the power-operated means, means for automatically locking the power-operated means in a position wherein the clutch is engaged and the speed drive is established, and means for releasing the locking means by a movement of the clutch actuating pedal.

20. In a vehicular drive system including a torque producing internal-combustion engine having an accelerator mechanism and a clutch for transmitting torque from the engine to a change-speed gear transmission providing a plurality of gear sets for establishing different speed drives; a fluid motor having a movable element, a source of fluid pressure different from atmosphere connected to the motor, means comprising valve means responsive to actuation of said accelerator mechanism for controlling the operation of the motor so that its movable element can move in opposite directions, means connecting the element with the clutch, means connecting the element with the gearing, said two connecting means being so arranged that movement of the element in one direction will first cause disengagement of the clutch and then a neutralization of a speed drive and movement of the element in the opposite direction will first cause establishment of a speed drive and then control re-engagement of the clutch, and locking means for disabling operation of the element of the fluid motor when the clutch is engaged and a speed drive is established.

21. In a vehicular drive system including a torque producing internal-combustion engine having an accelerator mechanism and a clutch for transmitting torque from the engine to a change-speed gear transmission providing a plurality of gear sets for establishing different speed drives; a fluid motor having a movable element, a source of fluid pressure connected to the motor, control means including valve means responsive to actuation of said accelerator mechanism for causing the element of the motor to move from one position to another and return, connecting means between the element and the clutch and the element and the gearing, said connecting means being so arranged that movement of the element in one direction will operably disengage the clutch and neutralize the gearing and movement in the opposite direction will establish a speed drive and control reengagement of the clutch, and spring means interposed in said connecting means between said element and said gearing and functioning only during the latter portion of the movement of the element in its said opposite direction for yieldably opposing re-engagement of the clutch.

22. In a vehicular drive system including a torque producing internal-combustion engine having an accelerator mechanism and a clutch for transmitting torque from the engine to a change-speed gear transmission providing a plurality of gear sets for establishing different speed drives; a power-operated means having a movable element, control means for the power-operated means responsive to actuation of said accelerator mechanism to cause its element to move from one position to another position and return; a bell-crank lever having one arm connected to the movable element, means comprising a rod and a yieldable element for connecting the other arm of the bell-crank lever to operate the gearing, and means operable by the bell-crank when the element moves in one direction to disengage the clutch and in the opposite direction to control re-engagement of the clutch, said rod and bell-crank lever being so associated that when the element is in the position wherein the clutch is engaged the rod will have passed from one side of the pivot of the bell-crank to the other and such movement will have been accommodated only by a stressing of the yieldable element.

23. In a vehicular drive system including a torque producing internal-combustion engine having an accelerator mechanism and a clutch for transmitting torque from the engine to a change-speed gear transmission providing a plurality of gear sets for establishing different speed drives; a power-operated means having a movable element, control means for the power-operated means responsive to actuation of said accelerator mechanism to cause its element to move from one position to another position and return, a bell-crank lever having one arm connected to the movable element, means comprising a rod for connecting the other arm of the bell-crank lever to operate the gearing, and means operable by the bell-crank when the element moves in one direction to disengage the clutch prior to operation of the gearing and in the opposite direction to control re-engagement of the clutch after operation of the gearing.

24. In a vehicular drive system including a torque producing internal-combustion engine having an accelerator mechanism and a clutch for transmitting torque from the engine to a change-speed gear transmission providing a plurality of gear sets for establishing different speed drives; a power-operated means having a movable element, control means for the power-operated means responstive to actuation of said accelerator mechanism to cause its element to move from one position to another position and return, a bell-crank lever having one arm connected to the movable element, means comprising a rod operably connecting the other arm of the bell-crank lever to the gearing, means operable by the bell-crank when the element moves in one direction to disengage the clutch prior to operation of the gearing and in the opposite direction to control re-engagement of the clutch after operation of the gearing, and means for retarding the re-engagement of the clutch as the element of the power means moves in said opposite direction.

25. In a vehicular drive system including a torque producing internal-combustion engine having an accelerator mechanism and a clutch for transmitting torque from the engine to a change-speed gear transmission providing a plurality of gear sets for establishing different speed drives; a power-operated means having a movable element, control means responsive to actuation of the accelerator mechanism for the power-operated means, means operably connecting the element to the clutch and to the gearing so that movement of the element from one position to another position and return will disengage the clutch, operate the gearing to establish a speed drive and then control re-engagement of the clutch, and spring means forming a part of the connecting means functioning only during re-engagement of the clutch to oppose the movement of the element of the power-operated means and thereby cause the clutch to re-engage at a retarded rate.

26. In a vehicular drive system including a torque producing internal-combustion engine and a clutch for transmitting torque from the engine to a change-speed gear transmission providing a plurality of gear sets for establishing different speed drives, a power-operated means having a movable element, control means responsive to actuation of the accelerator mechanism for the power-operated means, means operably connecting the element to the clutch and to the gearing so that movement of the element from one position to another position and return will disengage the clutch, operate the gearing to establish a speed drive and then control re-engagement of the clutch, and damping means forming a part of the connecting means operable only during the clutch re-engaging movement of the element of the power-operated means for retarding the movement of said element to thereby cause the clutch to re-engage at a retarded rate.

27. In a vehicular drive system including a torque producing internal-combustion engine having an accelerator mechanism and a clutch for transmitting torque from the engine to a change-speed gear transmission providing a plurality of gear sets for establishing different speed drives; a fluid motor having a movable element connected to the clutch, a source of fluid pressure connected with the fluid motor, control means responsive to actuation of the accelerator mechanism including valve means for causing the element to move in one direction to disengage the clutch and in the opposite direction to control re-engagement, means for establishing a speed drive, and means comprising restricting valve means operable when the speed drive is established for causing a retarding of the movement of the element of the fluid motor as it moves in the direction to control re-engagement of the clutch, said restricting valve means being ineffective to retard the movement of the element when the gearing is in neutral.

28. In a vehicular drive system including a torque producing internal-combustion engine having an accelerator mechanism and a clutch for transmitting torque from the engine to a change-speed gear transmission providing a plurality of gear sets for establishing different speed drives; a fluid motor having a movable element, a source of fluid pressure connected to the motor, control means including valve means responsive to actuation of said accelerator mechanism for causing the element of the motor to move from one position to another and return, connecting means between the element and the clutch and the element and the gearing, said connecting means being so arranged that movement of the element in opposite directions will operably disengage the clutch, control the gearing and control re-engagement of the clutch, and means comprising restricting valve means controlled by the establishment of a lower speed drive of the gearing only for retarding the movement of the element of the fluid motor during clutch re-engagement.

29. In a vehicular drive system including a torque producing internal-combustion engine having an accelerator mechanism and a clutch for transmitting torque from the engine to a change-speed gear transmission providing a plurality of gear sets for establishing different speed drives; a fluid motor having movable element, a source of fluid pressure connected to the motor, control means responsive to actuation of the accelerator mechanism including valve means for causing the element of the fluid motor to move in opposite directions at will, connecting means between the element and the clutch for causing disengagement of the clutch when the element moves in one direction and control re-engagement when the element moves in the opposite direction, connecting means between the element and the gearing for controlling certain speed drives of the gearing when the clutch is disengaged, means for manually controlling another speed drive, means for disconnecting the element of the fluid motor from the gearing when the manually-controlled speed drive is established, and means comprising a restricting valve operable only when the manually-controlled speed drive is established for retarding the movement of the element of the fluid motor during clutch re-engagement.

30. In a vehicular drive system including a torque producing internal-combustion engine having an accelerator mechanism and a clutch for transmitting torque from the engine to a change-speed gear transmission providing a plurality of gear sets for establishing different speed drives; a double ended fluid motor having a movable element, a source of fluid pressure different from atmosphere, conduit means for placing the source in communication with both ends of the motor, control means including valve means for selectively connecting opposite ends of the motor to the source and to atmosphere to thereby move the element in opposite directions, means operably connecting the element to control operation of the clutch, means for controlling the valve means by the accelerator mechanism, said valve means being conditioned when the accelerator mechanism is fully released to cause the element of the fluid motor to move in one direction and disengage the clutch and when moved from the fully released position to cause said element to move in the opposite direction and control re-engagement of the clutch, means for establishing a speed drive, and means operable when said speed drive is established and comprising a restricting valve means for retarding the movement of the motor element during its movement to control clutch re-engagement, said restricting valve being inoperative to establish a restricting flow of fluid when the gearing is neutralized.

31. In a vehicular drive system including a torque producing internal-combustion engine having an accelerator mechanism and a clutch for transmitting torque from the engine to a change-speed gear transmission providing a plurality of gear sets for establishing different speed drives; a fluid motor having a movable element, a source of pressure different from atmosphere connected to the motor, means comprising control valve means operated by the accelerator mechanism for alternately connecting the source and the atmosphere to opposite sides of the motor element to cause the element to move in opposite directions, connecting means between the element and the clutch for disengaging the clutch when the element moves in one direction and for controlling clutch re-engagement when the element moves in the opposite direction, means for establishing a speed drive, and means comprising a restricting valve operable when the speed drive is established for retarding the movement of the motor element during its clutch re-engaging movement, said last named means being inoperable to establish any retarding movement when the gearing is neutralized.

32. In a vehicular drive system including a torque producing internal-combustion engine having an accelerator mechanism and a clutch for transmitting torque from the engine to a change-speed gear transmission providing a plurality of gear sets for establishing different speed drives; power-operated means having a movable element operatively connected for disengaging the clutch and controlling re-engagement, means operatively connecting the gearing to said element for establishing a speed drive when the clutch is disengaged, control means operable by said accelerator mechanism for controlling operation of said power-operated means, and means operable when the speed drive is established for retarding the movement of the element of the power-operated means during its movement controlling re-engagement of the clutch, said retarding means being inoperable when the gearing is neutralized.

33. In control valve mechanism for association with an accelerator mechanism and a fluid motor having a reciprocable element connected to operate a clutch and control a member of a change-speed gearing and wherein said fluid motor is connected on opposite sides of its element to a source of pressure different from atmosphere and to atmosphere, said control mechanism comprising a control valve element having two operative positions, a fluid motor for controlling the movement of the valve element to its two positions, conduit means between the valve element fluid motor and the source, a second valve element for controlling the conduit means, and means for controlling the second valve element by the accelerator mechanism.

34. In mechanism which has a fluid motor provided with an element connected to operate a clutch and control a member of a change-speed gearing and which is controlled by the accelerator mechanism, a valve means for interposition in the conduit means between the source of fluid pressure and the fluid motor, said valve means comprising a valve element having two positions for connecting opposite sides of the movable element of and disconnecting the motor with the source and the atmosphere, a fluid motor connected to the valve element for controlling its movement to the two positions, means comprising a second valve element having two positions for controlling the operation of the first valve fluid motor, means for moving the second valve element to its two positions by the accelerator mechanism, said last named means comprising a member engageable by an element of the accelerator mechanism to move it to one position when the accelerator mechanism is fully released and to a second position when the accelerator mechanism is initially actuated from released position, said member being so constructed and associated with the accelerator mechanism element that the accelerator mechanism can move relatively to the member to control the engine speed after the member assumes its second position, and means for yieldably maintaining the member in either of its two positions.

35. In mechanism which has a fluid motor provided with an element connected to operate a clutch and control a member of a change speed gearing and which is controlled by the accelerator mechanism, a valve means for interposition in the conduit means between the source of fluid pressure and the fluid motor, said valve means comprising a valve element having two positions for connecting opposite sides of the movable element of and disconnecting the motor with the source and the atmosphere, a fluid motor connected to the valve element for controlling its movement to the two positions, means comprising a second valve element having two positions for controlling the operation of the first valve fluid motor, and means for moving the second valve element to its two positions by the accelerator mechanism, said last named means comprising a member engageable by an element of the accelerator mechanism to move it to one position when the accelerator mechanism is fully released and to a second position when the accelerator mechanism is initially actuated from released position, said member being so constructed and associated with the accelerator mechanism element that the accelerator mechanism can move relatively to the member to control the engine speed after the member assumes its second position.

36. In a vehicular drive system including a torque producing internal-combustion engine having an accelerator mechanism and a clutch for transmitting torque from the engine to a change-speed gear transmission providing a plurality of gear sets for establishing different speed drives, at least one of said speed drives being established by a control lever provided with a neutral position; a member to be moved to establish one of said drives, power-operated means having a movable element connected to move the member, means operatively connecting said element to said clutch for engaging and disengaging the clutch upon movement of said element, means for controlling the power-operated means in response to actuation of the accelerator mechanism so that said element will move from one position to another and return and thereby actuate the member while disengaging and then re-engaging said clutch, means for automatically locking the element in one of its positions wherein the clutch is engaged, other power-operated means for unlocking the locking means, and means for causing the last-named power-operated means to operate when the control lever is moved to the neutral position.

37. In a vehicular drive system including a torque producing internal-combustion engine having an accelerator mechanism and a clutch for transmitting torque from the engine to a change-speed gear transmission providing a plurality of gear sets for establishing different speed drives; the improvements which comprise power-operated means operatively connected to disengage the clutch and control its re-engagement, manually-controlled means movable to a plurality of positions for selecting establishing and neutralizing a speed drive, means for controlling the operation of the power means by the accelerator mechanism, means for automatically disabling the power means when the clutch is engaged and without utilizing any control functions of the accelerator mechanism, means operable by movement of the manually-controlled means to a neutralizing position for causing the disabling means to become inoperative, and pedally-operable means for rendering the aforesaid manually-controlled disabling of the said power means ineffective.

38. In a control mechanism for a change-speed gearing associated with an internal-combustion engine controllable by an accelerator mechanism and interconnected with said gearing by a friction with a main clutch, energizable power-operated means operably connected to disengage the clutch and control its re-engagement means effective to energize said power means, a manually-operated member operably connected for establishing and neutralizing a gear ratio by manual effort, means for controlling the operation of the power means by the accelerator mechanism, means controllable by the manually-operable member and effective when said gear ratio is established for causing the power means to so function as to produce a retarded engagement of said clutch and additional means actuatable only after predetermined initial operation of said power means to retard further engagement of said clutch.

39. In a control mechanism for a change speed gearing associated with an internal-combustion engine controllable by an accelerator mechanism and interconnected with said gearing by a friction clutch energizable, power operated means operably connected to disengage the clutch and control its re-engagement, a means effective to energize said power means manually-operated member operably connected for establishing and neutralizing a gear ratio by manual effort, means controlled by the manually operated member for also controlling establishment of another gear ratio when placed in a position other than that required for establishing or neutralizing the said first-named gear ratio, means controllable by the manually-operable member and effective when the first named speed ratio is established for causing the power means to so function as to produce a retarded engagement of said clutch, means for causing the last-named means to be inoperative to cause retarded engagement of the clutch when the manually-operated member is in its position controlling establishment of the said other gear ratio, and means operable independently of the manually-operable means for retarding clutch engagement under all vehicle operating conditions.

40. In a control mechanism for a change-speed gearing associated with an internal-combustion engine controllable by an accelerator mechanism and interconnected with said gearing by a friction clutch; a fluid pressure-operated motor having a movable element operably connected to disengage the clutch and control its re-engagement, a source of pressure fluid, means for controlling the operation of the fluid motor by the accelerator mechanism including a control valve, manually-controlled means operable for establishing and neutralizing a gear ratio, means comprising restricting valve means for retarding the movement of said motor element during its movement to control clutch re-engagement, means operable by the manually-controlled means for causing the restricting valve means to be operative when said gear ratio is established, and additional means operable independently of said fluid pressure-operated motor for retarding clutch re-engagement under all operating conditions.

41. In a control mechanism for a change-speed gearing having drive mechanism capable of producing a plurality of different gear ratios and being associated with an internal-combustion engine controllable by an accelerator mechanism; energizable power-operated means for operably disengaging the clutch and controlling its re-engagement, means effective to energize said power means, manually-controlled means, means for controlling establishment of a gear ratio when the manually-controlled means is in a predetermined position, and means operable when said manually-controlled means is in said predetermined position for automatically disabling operation of the power means if in a condition wherein said clutch is engaged and without utilizing any control function of said accelerator mechanism.

42. In a control mechanism for a change-speed gearing having a drive-mechanism providing a plurality of different gear ratios, and being associated with an internal-combustion engine controllable by an accelerator mechanism; energizable power operated means for operably disengaging said clutch and controlling its re-engagement, means effective to energize said power means, manually controlled means, means for controlling establishment of a gear ratio when the manually-controlled means is in a predetermined position, means operable when said manually-controlled means is in said predetermined position for automatically disabling operation of the power means if in a condition wherein said clutch is engaged and without utilizing any control function of said accelerator mechanism, and means for causing said disabling means to become inoperative at will.

43. In a vehicular power drive control system comprising an internal-combustion engine controlled by an accelerator mechanism and a change-speed gear transmission having a plurality of gear sets operable for establishing different forward speed drives, said engine and transmission being drivingly connected together by a friction clutch having an actuating pedal; motor-power means operatively connected to disengage said clutch, establish selectively either of two of said speed drives, and control re-engagement of said clutch; controllable selecting means for predetermining which speed drive said motor will establish when operated; means for controlling said selecting means; means for controlling the operation of said motor by said accelerator mechanism; means for automatically disabling the operation of said motor when in a condition wherein said clutch is engaged and a speed drive is established; and means for causing said disabling means to become inoperative at will by actuating said clutch pedal within its lost-motion travel only.

44. In a vehicular drive system including a torque producing internal-combustion engine having an accelerator mechanism and a friction clutch provided with engageable and disengageable friction elements for transmitting torque from the engine to a change-speed gear transmission providing a plurality of gear sets for establishing different forward speed drives; the improvements which comprise a manually-operated member, means associated with the gearing for establishing and neutralizing one speed drive, a single connection between the manual member and said means for bringing about the manual establishment and neutralizing of said one speed ratio, power-operated means for establishing either of two other speed drives, selecting means for controlling which of said two other speed drives will be established by the power-operated means, means operable by manual means and the single connection for controlling the selecting means without affecting the neutral condition of the said one speed drive, means linking one of said clutch elements to said power-operated means for interrupting torque transmission prior to establishment of any one of said speed drives, and means for controlling operation of said power-operated means by said accelerator mechanism.

45. In a vehicular drive system including a torque producing internal-combustion engine having an accelerator mechanism and a clutch provided with engageable and disengageable friction elements for transmitting torque from the engine to a change-speed gear transmission providing at least three gear sets for establishing three forward speed drives; the improvements which comprise a combined selecting and shifting means comprising a rotatable selecting member for two of the speed drives, a second and independent rotatable member for establishing and neutralizing the third speed drive, means for rotating the selecting member, connecting means between the selecting member and the second rotatable member for the third speed drive, means embodied in the connecting means for establishing the connection only when the selecting member is moved beyond one of its selecting positions, power means for disengaging said clutch friction elements to interrupt torque transmission to said gearing prior to establishment of any one of said speed drives, and means for controlling operation of said power means by said accelerator mechanism.

46. In a vehicular drive system including a torque producing, internal-combustion engine having an accelerator mechanism and a clutch provided with engageable and disengageable friction elements for transmitting torque from the engine to a change-speed gear transmission providing a plurality of gear sets for establishing at least three forward speed drives; the improvements which comprise a combined selecting and shifting means comprising a rotatable selecting member for two of the speed drives, a second rotatable member for establishing and neutralizing the third speed drive, means for rotating the selecting member, connecting means between the selecting member and a second rotatable member for the third speed drive, means embodied in the connecting means for establishing a connection only when the selecting member is moved beyond one of its selecting positions, means for establishing the two speed drives depending upon the selecting position of the selecting member, means for preventing the establishment of either of the two speed drives when the third speed drive is established and comprising an element rotatable with the second rotatable member, power means for disengaging said clutch friction elements prior to establishment of any one of said speed drives, and means for controlling operation of said power means by said accelerator mechanism.

47. In a vehicular drive system including a torque producing internal-combustion engine having an accelerator mechanism and a clutch provided with engageable and disengageable friction elements for transmitting torque to the engine to a change-speed gear transmission providing a plurality of gear sets for establishing at least two forward speed drives; the improvements which comprise a shiftable member for the two speed drives, a pivoted double arm lever, means connecting the lever and the shiftable member so that rotation of the lever in one direction will establish one speed drive and rotation in the opposite direction will establish the other speed drive, a shifter plate mounted for reciprocation in a straight line, a shifter link pivoted to the plate, means for selectively connecting the link to the arms of the lever so that the link can rotate the lever in opposite directions, means for reciprocating the shifter plate, power means for disengaging said clutch friction elements prior to establishment of any one of said speed drives, and means for controlling operation of said power means by said accelerator mechanism.

48. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing at least two forward speed drives, a shiftable member for the two speed drives, a pivoted double arm lever, means connecting the lever and the shiftable member so that rotation of the lever in one direction will establish one speed drive and rotation in the opposite direction will establish the other speed drive, a shifter plate mounted for reciprocation in a straight line, a shifter link pivoted to the plate, means for selectively connecting the link to the arms of the lever so that the link can rotate the lever in opposite directions, means for reciprocating the shifter plate, means operable at will for disconnecting the last-mentioned means from the shifter plate so as to release the means to operate without operating the shifter plate, power means for disengaging said clutch friction elements prior to establishment of either one of said speed drives, and means for controlling operation of said power means by said accelerator mechanism.

49. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing at least two forward speed drives, a shiftable member for the two speed drives, a pivoted double arm lever, means connecting the lever and the shiftable member so that rotation of the lever in one direction will establish one speed drive and rotation in the opposite direction will establish the other speed drive, a shifter plate mounted for reciprocation in a straight line, a shifter link pivoted to the plate, means for selectively connecting the link to the arms of the lever so that the link can rotate the lever in opposite directions, means for reciprocating the shifter plate, means operable at will for disconnecting the last-mentioned means from the shifter plate so as to release the means to operate without operating the shifter plate, power means for disengaging said clutch friction elements prior to establishment of any one of said speed drives, and means for controlling operation of said power means by said accelerator mechanism.

50. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing at least two different speed drives; the improvements which comprise a shiftable member for the two speed ratios, a pivoted double arm lever, means connecting the member and lever so that rotation of the lever in opposite directions will move the member in opposite directions to establish the two speed drives, means for rotating the lever in opposite directions including a reciprocating shifter plate and a pivoted shifter link carried thereby by selective connection to the two arms of the lever, a pivoted selecting member having diverging cam surfaces for guiding the link for connection with the arms when the member is moved to two different positions from a central position, means for reciprocating the plate and the link, means on the selecting member and the link for preventing the reciprocal movement of the plate and link when the selecting member is in the central position, power means for disengaging said clutch friction elements prior to either of the speed drives being established, and means for controlling operation of said power means by said accelerator mechanism.

51. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing at least two speed drives; the improvements which comprise a shiftable member for the two speed drives, a reciprocal shifting plate, a shifter link pivoted to the plate, means for connecting the link to the member to move it in opposite directions by movement of the shifter plate in one direction, selecting means for determining in which direction the member will be moved by the shifter plate, means for reciprocating the shifter plate, means controlled by the selecting means for preventing reciprocation of the shifter plate, power means for disengaging the clutch friction elements prior to establishment of either one of said speed drives, and means for controlling operation of said power means by said accelerator mechanism.

52. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing a plurality of speed drives; the improvements which comprise a first shiftable member for controlling two speed drives, a second shiftable member for controlling a third speed drive, a rotatable shaft for operating each of said shiftable members, a third rotatable shaft aligned with the shaft for rotating the first shiftable member, a shifter plate supported for reciprocation on the third shaft and the shaft for operating the second shiftable member, means comprising selecting means for connecting the shifter plate to rotate in opposite directions the shaft for the first shiftable member when the shifter plate is moved in one direction to thereby establish said speed drives selectively, means for controlling the selecting means by the third shaft, means for reciprocating the shifter plate, means for rotating the shaft of the second shiftable member to control said third speed drive, power means or disengaging said clutch friction elements prior to establishment of any one of said speed drives, and means for controlling operation of said power means by said accelerator mechanism.

53. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing at least three speed forward drives; the improvements which comprise a first shiftable member for controlling two of said speed drives, a second shiftable member for controlling a third speed drive, a rotatable shaft for operating each member, a third rotatable shaft aligned with the shaft for rotating the first shiftable member, a shifter plate supported for reciprocation on the third shaft and the shaft for the second of said members, means comprising selecting means for connecting the shifter plate to rotate in opposite directions the shaft for the first shiftable member when the shifter plate is moved in one direction to thereby establish said speed drives respectively, means for controlling the selecting means by the third shaft, means for reciprocating the shifter plate, means for rotating the shaft of the second member to control the third speed drive, means for peventing reciprocation of the shifter plate when the third speed drive is established, power means for disengaging the clutch friction elements prior to establishment of any one of said speed drives, and means for controlling operation of said power means by said accelerator mechanism.

54. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing different speed drives; the improvements which comprise a first shiftable member for controlling two of said speed drives, a second shiftable member for controlling a third speed drive, a rotatable shaft for operating each member, a third rotatatable shaft aligned with the shaft for rotating the first member, a shiftable plate supported for reciprocation on the third shaft and the shaft for the second member, means comprising selecting means for connecting the shifter plate to rotate in opposite directions the shaft for the first member when the shifter plate is moved in one direction to thereby establish said speed drives selectively, means for controlling the shifting means by the third shaft, means for reciprocating the shifter plate, means for rotating the shaft of the second member to control the third speed drive, means for preventing reciprocation of the shifter plate when the third speed drive is established, said last-mentioned means comprising an element movable with the shaft of the member for the third speed drive, power means for disengaging said clutch friction elements prior to establishment of any one of said speed drives, and means for controlling operation of the power means by said accelerator mechanism.

55. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing different speed drives; a first shiftable member for controlling two of said speed drives, a second shiftable member for controlling a third said speed drives, a rotatable shaft for operating each of said members, a third rotatable shaft aligned with the shaft for rotating the first of said members, a shifter plate supported for reciprocation on the third shaft and the shaft for operating the second of said members, means comprising selecting means for connecting the shifter plate to rotate in opposite directions the shaft for the first of said members when the shifter plate is moved in one direction to thereby establish said speed drive selectively, means for controlling the selecting means by the third shaft, means for reciprocating the shifter plate, means for rotating the shaft for the second of said members to control the third speed drive, means controlled by the selecting means for preventing reciprocation of the shifter plate to establish the two speed drives, power means for disengaging the clutch friction elements prior to establishment of any one of said speed drives, and means for controlling operation of said power means by said accelerator mechanism.

56. In a vehiclar drive system including a torque producing internal-combustion engine having an accelerator mechanism and a clutch provided with engageable and disengageable friction elements for transmitting torque from the engine to a change-speed gear transmission providing a plurality of gear sets for establishing different speed drives; the improvements which comprise power-operated means provided with a movable element operably connected to the gearing to establish either of two of said speed drives, selecting means for determining which speed drive will be established, means for controlling the operation of the power-operated means, locking means for maintaining the element of the power-operating means in a position where a speed drive is established, means for unlocking the locking means at will, means operatively connecting said clutch friction elements to said power operating means for disengaging said friction elements prior to establishment of any one of said speed drives, and additional control means for controlling operation of said power means by said accelerator mechanism.

57. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing different speed drives; the improvements which comprise a fluid pressure-operated motor provided with a movable element operably connected to the gearing to establish either of two speed drives, a source of pressure different from atmosphere connected to the motor, selecting means for determining which speed will be established by operation of the motor, means for controlling the operation of the motor, locking means for maintaining the element of the motor in a position where a speed ratio is established, means for unlocking the locking means at will, and means operatively connecting the movable element of said motor to the clutch for disengaging said clutch friction elements prior to establishment of any one of said speed drives.

58. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing different forward speed drives; the improvements which comprise a fluid pressure-operated motor provided with a movable element, a source of fluid pressure different from atmosphere connected to the motor, connecting means between the element and the gearing to cause the establishment of a speed drive when the element moves in one direction and the neutralization of the speed drive when moved in the opposite direction, selecting means for determining which speed will be established, means comprising valve means interposed between the source and the motor for controlling the direction of movement of the movable element of the motor, means linking the movable element of the motor to the clutch for disengaging said clutch friction elements prior to establishment of any one of said speed drives, and means for controlling actuation of said motor by said accelerator mechanism.

59. In a vehicular drive system including a torque producing internal-combustion engine having an accelerator mechanism and a clutch provided with engageable and disengageable friction elements for transmitting torque from the engine to a change-speed gear transmission providing a plurality of gear sets for establishing different forward speed drives; the improvements which comprise a fluid pressure-operated motor provided with a movable element, a source of fluid pressure different from atmosphere connected to the motor, connecting means between the element and the gearing for causing the establishment of a speed drive when the element moves in one direction and the neutralization of a speed drive when the element moves in the opposite direction, selecting means for determining which speed drive will be established, means comprising valve means interposed between the source and the motor for controlling the direction of movement of the movable element of the motor, manual means for controlling the selecting means, means also controlled by the manual means for holding the element of the fluid motor in a position wherein a speed drive is established, means operatively connecting the movable element of the fluid motor with the clutch for disengaging said clutch friction elements prior to establishment of a speed drive, and means for controlling actuation of said motor by said accelerator mechanism.

60. In a vehicular drive system including a torque producing internal-combustion engine having an accelerator mechanism and a clutch having a clutch pedal and adapted for transmitting torque from the engine to a change-speed gear transmission providing a plurality of gear sets for establishing different speed drives; a source of fluid pressure different from atmosphere, a fluid pressure-actuated motor having a movable element, means operatively connecting the element to the clutch so that when the element moves from one end of the motor to the other end the clutch will be disengaged and when it returns the clutch will be controlled into engagement, valve means for controlling the connecting of the motor with the source and the atmosphere to cause the movement of the element to and fro, means for controlling the valve means by the accelerator mechanism, means for automatically locking the element in the position wherein the clutch is engaged, means for releasing the locking means by slight free-movement of the pedal in a clutch disengaging direction, and means operatively connecting the element to a shiftable element of the transmission for establishing a speed drive while said clutch is disengaged.

61. In a vehicular power drive control system comprising an internal-combustion engine controlled by an accelerator mechanism, and a change-speed gear transmission having a plurality of gear sets operable for establishing different forward speed drives, said engine and transmission being drivingly connected with each other by a friction clutch actuated by a pedal having lost-motion movement within two limits prior to effective actuation of said clutch; motor-power means operatively connected to disengage said clutch and neutralize an active speed drive as one cycle of the dual-cycle function of said motor, and to establish a selected speed drive and regulate said clutch into engagement as the second cycle thereof to render effective the drive of said vehicle; controllable selecting means for predetermining the speed drive said motor will establish when operated; means for controlling said selecting means, means for controlling the operation of said motor by said accelerator mechanism, means for automatically disabling the operation of said motor when in a condition wherein said clutch is engaged and a selected speed drive established, and means for causing said disabling means to become inoperative at will by moving said clutch pedal within the lost-motion limits thereof.

GLENN T. RANDOL.

REFERENCES CITED

The following references are of record in the file of this patent:

UNITED STATES PATENTS

| Number | Name | Date |
|---|---|---|
| 843,076 | Detrick | Feb. 5, 1907 |
| 1,964,693 | Hill | June 26, 1934 |
| 2,049,738 | Hill et al. | Aug. 4, 1936 |
| 2,058,586 | Heiss et al. | Oct. 27, 1936 |
| 2,086,576 | Price et al. | July 13, 1937 |
| 2,237,159 | Neff | Apr. 1, 1941 |
| 2,244,092 | Wheeler | June 3, 1941 |
| 2,257,511 | Neff | Sept. 30, 1941 |
| 2,263,400 | Schwarz | Nov. 18, 1941 |
| 2,268,916 | Wilkerson | Jan. 6, 1942 |
| 2,277,454 | Porsche | Mar. 24, 1942 |
| 2,280,002 | Neracher | Apr. 14, 1942 |
| 2,292,253 | Thurber | Aug. 4, 1942 |
| 2,297,026 | Sanford et al. | Sept. 29, 1942 |
| 2,345,726 | Bull | Apr. 4, 1944 |
| 2,349,297 | Neracher et al. | May 23, 1944 |
| 2,352,212 | Lang et al. | June 27, 1944 |
| 2,362,242 | Casler | Nov. 7, 1944 |